United States Patent
Kiyo et al.

(10) Patent No.: US 9,493,120 B2
(45) Date of Patent: Nov. 15, 2016

(54) IMAGE GENERATOR

(71) Applicant: FUJITSU TEN LIMITED, Kobe-shi, Hyogo (JP)

(72) Inventors: Kouei Kiyo, Kobe (JP); Masahiro Yamada, Kobe (JP); Yasuyoshi Sawada, Kobe (JP); Takumi Hayashida, Kobe (JP)

(73) Assignee: FUJITSU TEN LIMITED, Kobe-shi, Hyogo (JP)

( * ) Notice: Subject to any disclaimer, the term of this patent is extended or adjusted under 35 U.S.C. 154(b) by 369 days.

(21) Appl. No.: 13/914,016

(22) Filed: Jun. 10, 2013

(65) Prior Publication Data
US 2014/0055487 A1 Feb. 27, 2014

(30) Foreign Application Priority Data

Aug. 21, 2012 (JP) ................... 2012-182011

(51) Int. Cl.
| | | |
|---|---|---|
| *G09G 5/12* | (2006.01) | |
| *B60R 1/00* | (2006.01) | |
| *G06T 11/60* | (2006.01) | |
| *H04N 7/18* | (2006.01) | |
| *G06T 15/20* | (2011.01) | |

(52) U.S. Cl.
CPC ............. *B60R 1/002* (2013.01); *B60R 1/00* (2013.01); *G06T 11/60* (2013.01); *G06T 15/205* (2013.01); *H04N 7/181* (2013.01); *B60R 2300/303* (2013.01)

(58) Field of Classification Search
CPC ..................................................... H04N 7/181
USPC ........................................................ 345/629
See application file for complete search history.

(56) References Cited

U.S. PATENT DOCUMENTS

| | | | | |
|---|---|---|---|---|
| 7,161,616 | B1* | 1/2007 | Okamoto | B60R 1/00 348/148 |
| 7,307,655 | B1* | 12/2007 | Okamoto | G06K 9/00791 348/222.1 |
| 2006/0192660 | A1* | 8/2006 | Watanabe | B60R 1/00 340/435 |
| 2009/0138919 | A1* | 5/2009 | Mori | B60R 1/00 725/75 |
| 2010/0066518 | A1* | 3/2010 | Ohshima | B60R 1/00 340/435 |
| 2010/0245577 | A1* | 9/2010 | Yamamoto | B60R 1/00 348/148 |
| 2011/0032357 | A1* | 2/2011 | Kitaura | B60R 1/00 348/148 |

(Continued)

FOREIGN PATENT DOCUMENTS

| | | |
|---|---|---|
| JP | B2-3300334 | 7/2002 |
| JP | A-2009-118416 | 5/2009 |
| JP | A-2010-67095 | 3/2010 |

*Primary Examiner* — Javid A Amini
(74) *Attorney, Agent, or Firm* — Oliff PLC

(57) ABSTRACT

An image acquisition part acquires a plurality of shot images captured by a plurality of cameras disposed on a vehicle, each of the plurality of shot images showing a periphery of the vehicle. An image composer projects data of the plurality of shot images onto a virtual projection surface corresponding to the periphery of the vehicle, and generates a composite image showing the periphery of the vehicle viewed from a virtual viewpoint, using the data projected onto the virtual projection surface. The image composer uses, as the virtual projection surface, a special virtual projection surface that includes a curved area having an upward convex curve. The curved area includes an area where a distance from a location of the vehicle is relatively short and a slope is relatively high, and another area where the distance from the location of the vehicle is relatively long and the slope is relatively low.

17 Claims, 22 Drawing Sheets

(56) References Cited

U.S. PATENT DOCUMENTS

| | | | |
|---|---|---|---|
| 2011/0137512 A1* | 6/2011 | Harumoto | F16H 63/42 701/31.4 |
| 2011/0234802 A1* | 9/2011 | Yamada | B60R 1/00 348/148 |
| 2012/0314072 A1* | 12/2012 | Kiyo | B60R 1/00 348/148 |

* cited by examiner

IMAGE GENERATOR

BACKGROUND OF THE INVENTION

Field of the Invention

The invention relates to a technology for generating an image that shows a periphery of a vehicle.

Description of the Background Art

Conventionally, an image display system that generates an image showing the periphery of a vehicle such as a car, and displays the generated image on a display installed in a vehicle cabin is known. By use of such an image display system, a user (typically a driver) can check the periphery of the vehicle substantially in real time.

Another image display system proposed these days generates a composite image for display based on a plurality of shot images, showing the periphery of a vehicle viewed from a virtual viewpoint. Such an image display system is capable of generating, for example, an overview image that is a composite image showing the periphery of the vehicle viewed from the viewpoint set above the vehicle. The user can check the whole periphery of the vehicle by looking at such a composite image.

Such a composite image described above, showing the periphery of the vehicle viewed from the virtual viewpoint, is generated by use of the data of a plurality of shot images projected onto a virtual projection surface corresponding to the periphery of the vehicle. Such a projection surface is generally created in the shape of a horizontal plane along a horizontal direction. Another projection surface proposed these days is created in the shape where the area in the vicinity of a vehicle is a substantially horizontal plane and the slope of area farther away from the vehicle location is higher (like a bowl shape).

The area in the vicinity of the vehicle on either shape of the two projection surfaces described above for generation of a composite image is created in the shape of a substantially horizontal plane. Thus, the image of the object existing in the vicinity of the vehicle is projected onto the area of the substantially horizontal plane on the projection surface. As above, in the case where the image of the object is projected onto the area of the substantially horizontal plane, and where the object exists above a road in a distance, the image of the object is projected onto the location away from the vehicle location.

Therefore, when looking at the composite image generated by use of the data projected on the projection surface, the user may feel that the object existing actually in the vicinity of the vehicle is away from the vehicle. As a result, the user may drive the vehicle having misperception of the location relation between the vehicle and the object, since the object appears to be farther away from the vehicle than in reality for the user.

SUMMARY OF THE INVENTION

According to one aspect of the invention, an image generator that is used in a vehicle includes an acquisition part that acquires a plurality of shot images captured by a plurality of cameras disposed on the vehicle, each of the plurality of shot images showing a periphery of the vehicle; and a generator that projects data of the plurality of shot images onto a virtual projection surface which corresponds to the periphery of the vehicle, and that generates a composite image showing the periphery of the vehicle viewed from a virtual viewpoint, by use of the data projected onto the virtual projection surface. The virtual projection surface includes a first virtual projection surface that has an area where a distance from a location of the vehicle is relatively short and a slope is relatively high, and another area where the distance from the location of the vehicle is relatively long and the slope is relatively low.

Since an image of an object existing in a vicinity of the vehicle is projected onto the area where the slope of the virtual projection surface is relatively high, the degree to which a user feels that, when looking at the composite image, the object is away from the vehicle can be reduced.

According to another aspect of the invention, the first virtual projection surface has an upward convex curve.

The image of the object can be shown smoothly in the composite image.

According to another aspect of the invention, the slope of a part of the first virtual projection surface opposed to one of a front face and a back face of the vehicle is higher than the slope of another part of the first virtual projection surface opposed to one of side faces of the vehicle.

Higher slope of the parts each of which is opposed to one of the front face and the back face in a traveling direction of the vehicle can largely reduce the degree to which the user feels that the object with a possible collision with the vehicle is away from the vehicle.

Therefore, the object of the invention is to reduce the degree to which the user feels that the object is away from the vehicle, when looking at the composite image.

These and other objects, features, aspects and advantages of the invention will become more apparent from the following detailed description of the invention when taken in conjunction with the accompanying drawings.

DESCRIPTION OF THE EMBODIMENTS

Hereinafter, some embodiments of the invention are described with reference to attached drawings.

1. First Embodiment

1-1. Configuration

Figure 1:
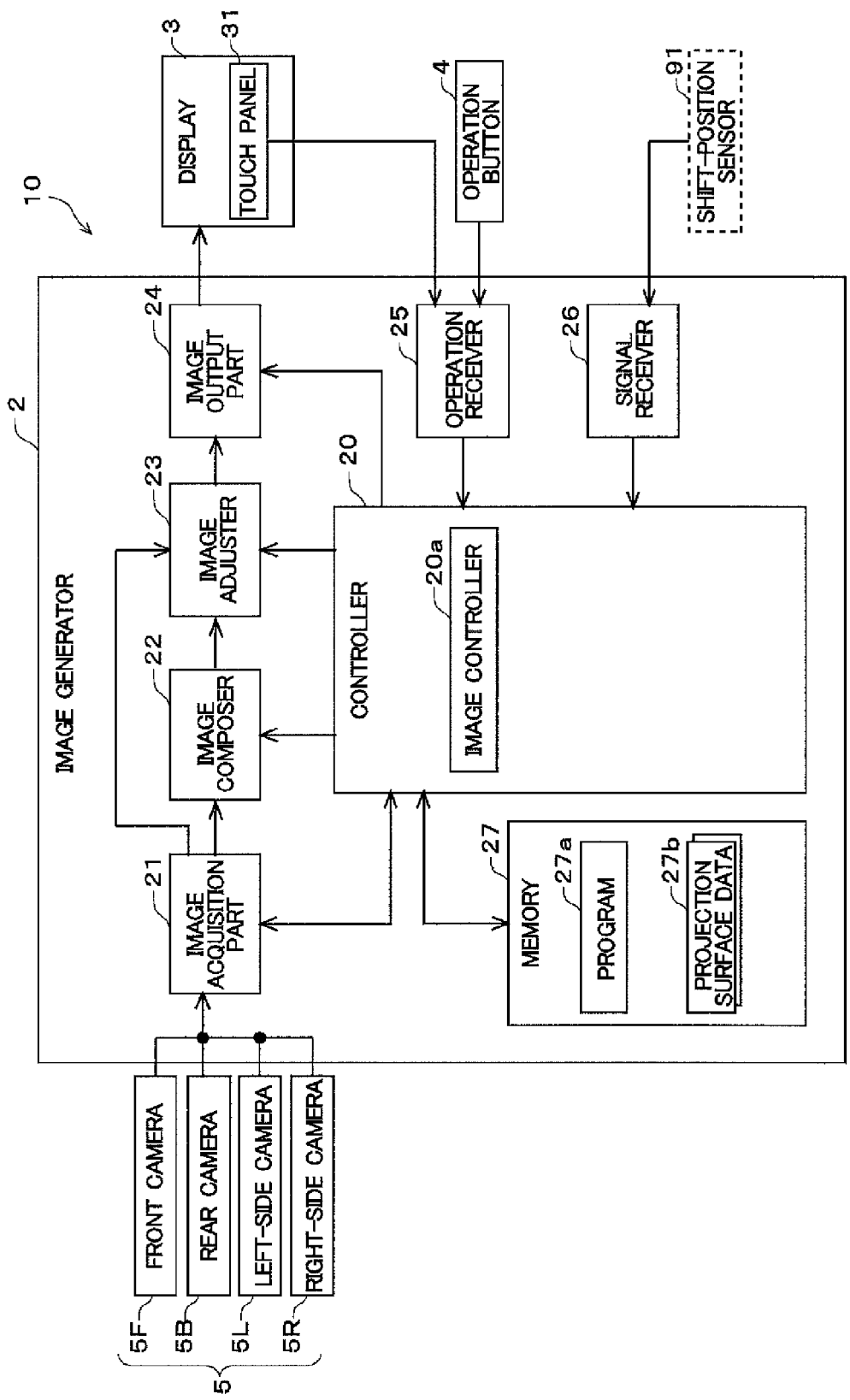
FIG. 1 shows a configuration of an image display system of the first embodiment.

FIG. 1 shows a configuration of an image display system 10 of the first embodiment. The image display system 10 that is for use in a vehicle (car in the embodiment) has functions to generate the image showing the periphery of the vehicle and to display the generated image in a vehicle cabin. A user (typically a driver) of the image display system 10 can check the periphery of the vehicle substantially in real time by using the image display system 10. Hereafter, the vehicle equipped with the image display system 10 is referred to as "own vehicle."

As shown in the figure, the image display system 10 primarily includes a plurality of cameras 5, an image generator 2, a display 3 and an operation button 4. Each of the plurality of cameras 5 captures a shot image of the periphery of the own vehicle, and enters the captured shot image to the image generator 2. The image generator 2 generates a display image to be displayed on the display 3 by use of the shot image of the periphery of the own vehicle. The display 3 displays the display image generated by the image generator 2. The operation button 4 receives the operations by the user.

Each of the plurality of cameras 5 having a lens and an image sensor electronically captures the shot image of the periphery of the own vehicle. The plurality of cameras 5 include a front camera 5F, a rear camera 5B, a left-side camera 5L and a right-side camera 5R. The four cameras 5F, 5B, 5L and 5R are respectively disposed at different locations on an own vehicle 9, and the optical axes of the four cameras are set at the angles pointing different directions around the own vehicle 9.

Figure 2:
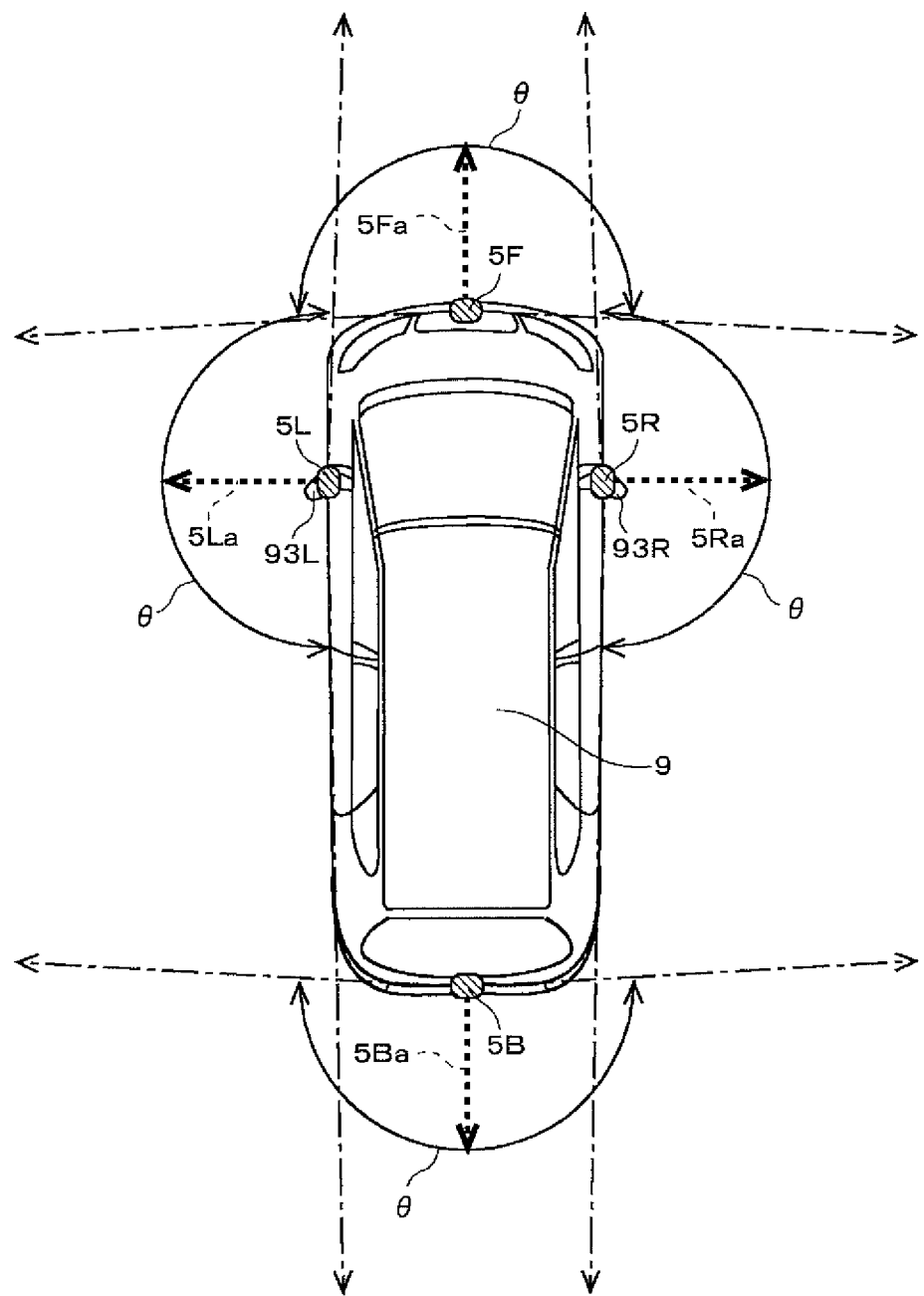
FIG. 2 shows the directions of respective optical axes of four cameras.

FIG. 2 shows the directions of respective optical axes of the four cameras 5F, 5B, 5L and 5R. The front camera 5F is disposed on the front end of the own vehicle 9, and an optical axis 5Fa of the front camera 5F is set at the angle pointing the straight forward direction of the own vehicle 9. The rear camera 5B is disposed on the rear end of the own vehicle 9, and an optical axis 5Ba of the rear camera 5B is set at the angle pointing the direction opposite to the straight forward direction. The left-side camera 5L is disposed on a left-side mirror 93L of the left side of the own vehicle 9, and an optical axis 5La of the left-side camera 5L is set at the angle pointing the left direction (direction perpendicular to the straight forward direction) of the own vehicle 9. The right-side camera 5R is disposed on a right-side mirror 93R of the right side of the own vehicle 9, and an optical axis 5Ra of the right-side camera 5R is set at the angle pointing the right direction (direction perpendicular to the straight forward direction) of the own vehicle 9.

Each of the cameras 5F, 5B, 5L and 5R uses a wide-angle lens, such as a fish-eye lens, which has the field angle $\theta$ of 180 degrees or more. Therefore, combination use of the four cameras 5F, 5B, 5L and 5R allows for photographing the whole periphery of the own vehicle 9 at a time.

Here is a further description based on FIG. 1. The display 3 including a thin display panel, such as a crystal liquid panel, displays various kinds of information and images. The display 3 is installed, for example, in an instrument panel of the own vehicle 9 so that a user can look at the screen of the display 3. The display 3 may be disposed in one housing with the image generator 2 as an integrated apparatus of the display 3 and the image generator 2, or may be disposed as a single apparatus separated from the image generator 2. The display 3 including a touch panel 31 on the display panel is capable of receiving the operation the user.

The operation button 4 is an operation member that receives the operation by the user. The operation button 4 disposed, for example, on a steering wheel of the own vehicle 9 receives the operation primarily by a driver. The user can conduct various operations to the image display system 10 via the operation button 4 and the touch panel 31 disposed on the display 3. When one of the operation button 4 and the touch panel 31 receives the operation by the user, the operation signal that represents operation details is entered into the image generator 2.

The image generator 2 that is an electronic apparatus capable of various kinds of image processing includes an image acquisition part 21, an image composer 22, an image adjuster 23 and an image output part 24.

The image acquisition part 21 acquires the shot images captured by the four cameras 5F, 5B, 5L and R respectively. The image acquisition part 21 has an image processing function, such as a function for converting an analog shot image to a digital shot image. The image acquisition part 21 processes the acquired shot image based on prescribed image processing, and enters the processed shot image into the image composer 22 and the image adjuster 23.

The image composer 22 is a hardware circuit that conducts image processing for generating a composite image. The image composer 22 generates a composite image that shows the periphery of the own vehicle 9 viewed from a virtual viewpoint, by synthesizing a plurality of the shot images captured by the plurality of cameras 5. The image composer 22 projects the data of the plurality of the shot images onto the virtual projection surface corresponding to the periphery of the own vehicle 9, and generates the composite image by use of the data projected onto the projection surface. The method for generating the composite image is detailed later.

The image adjuster 23 generates the display image to be displayed on the display 3. The image adjuster 23 generates the display image including the composite image and the shot image by use of the composite image generated by the image composer 22 and the shot image acquired by the image acquisition part 21.

The image output part 24 outputs to the display 3 the display image generated by the image adjuster 23 so as to display the display image on the display 3. As above, the composite image showing the periphery of the own vehicle 9 viewed from the virtual viewpoint is displayed on the display 3.

The image generator 2 further includes a controller 20, an operation receiver 25, a signal receiver 26 and a memory 27. The controller 20 that is a microcomputer including a CPU, RAM and ROM controls collectively the whole of the image generator 2.

The operation receiver 25 receives the operation signals output by the operation button 4 and the touch panel 31 upon the operations by the user. In this way, the operation receiver 25 receives the operation by the user. The operation receiver 25 enters the received operation signal into the controller 20.

The signal receiver 26 receives a signal from another apparatus disposed separately from the image generator 2 on the own vehicle 9, and enters the received signal into the controller 20. The signal receiver 26 receives, for example, from a shift-position sensor 91 the signal that indicates the shift position of a shift lever in a gearbox installed on the own vehicle 9. The controller 20 is capable of judging, based on the received signal, whether the traveling direction of the own vehicle 9 is the forward direction or the backward direction.

The memory 27 that is a nonvolatile memory, such as a flash memory, stores various kinds of information. The memory 27 stores a program 27a as firmware and various data for generation of the composite image by the image composer 22. A plurality of projection surface data 27b are included as such data for generation of the composite image.

The arithmetic processing performed by the CPU based on the program 27a stored in the memory 27 provides various kinds of functions of the controller 20. An image controller 20a shown in the figure is a part of the function parts provided by the arithmetic processing performed by the CPU based on the program 27a.

The image controller 20a controls the image composer 22 that generates the composite image and the image adjuster 23 that generates the display image. The image controller 20a controls the image composer 22 and the image adjuster 23 to generate respectively the composite image and the display image conforming to the running conditions of the own vehicle 9 and the operation by the user.

1-2. Generation of Composite Image

Figure 3:
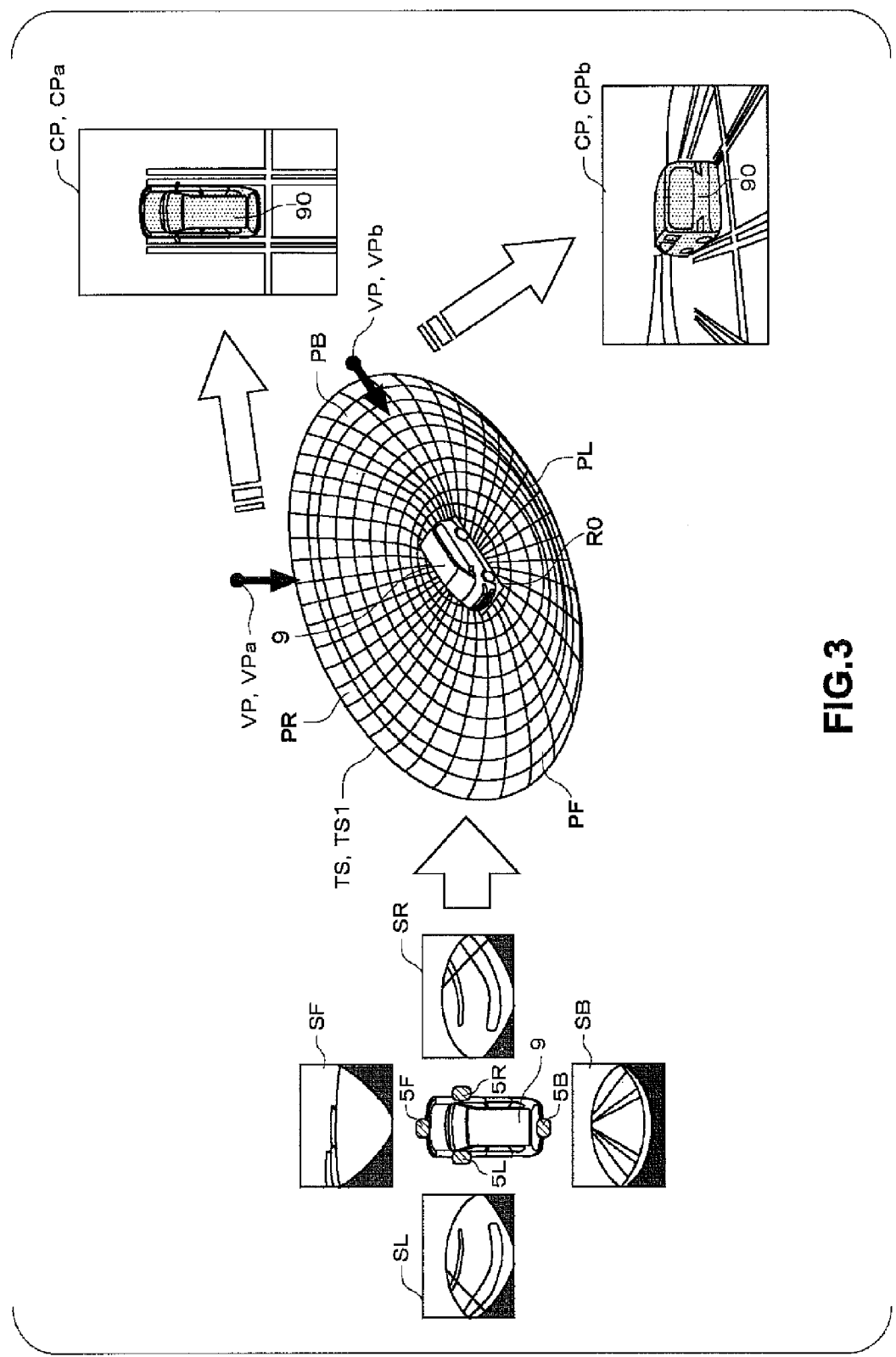
FIG. 3 describes a method of how an image composer generates a composite image.

Here is a description about the method of how the image composer 22 generates the composite image that shows the periphery of the own vehicle 9 viewed from the virtual viewpoint. FIG. 3 describes the method of how the image composer 22 generates the composite image.

The front camera 5F, the rear camera 5B, the left-side camera 5L and the right-side camera 5R respectively capture a shot image SF showing the forward area of the own vehicle 9, a shot image SB showing the rear area, a shot image SL showing the left side area, and a shot image SR showing the right side area. The four shot images SF, SB, SL and SR overall include the data covering the whole periphery of the own vehicle 9.

The image composer 22 projects the data (each pixel value) included in the four shot images SF, SB, SL and SR onto a projection surface TS that is virtually created in three-dimensional space. The projection surface TS is the virtual three-dimensional surface corresponding to the periphery of the own vehicle 9. The center area of the projection surface TS is designated as a vehicle area R0 corresponding to the location of the own vehicle 9.

The image composer 22 selectively uses one of the projection surfaces that are in different shapes, based on the control by the image controller 20a as the projection surface TS. The shapes of the projection surfaces are prospectively designated by the plurality of projection surface data 27b stored in the memory 27. The projection surface TS shown in FIG. 3 is a projection surface TS1 that is one projection surface for normal use among the projection surfaces (hereinafter, referred to as "normal projection surface TS1"). The normal projection surface TS1 is created in the bowl shape having a downward concave curve.

Figure 4:
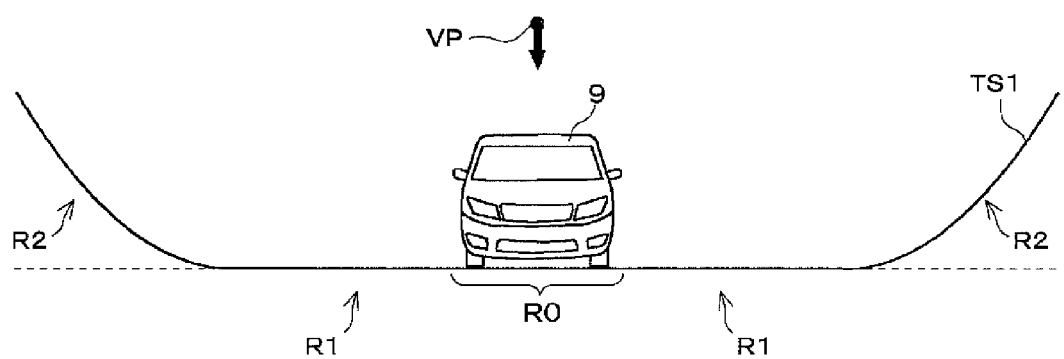
FIG. 4 shows a cross-section view of a normal projection surface that is cut along side-to-side direction of an own vehicle.

FIG. 4 shows the cross-section view of the normal projection surface TS1 that is cut along side-to-side direction of the own vehicle 9. As shown in the figure, the normal projection surface TS1 has a horizontal plane part created along the horizontal direction in the vicinity of the vehicle area R0 (location of the own vehicle 9), and a curved part created in the shape that the area farther away from the vehicle area R0 is steeper (higher in slope). In the specification, the "slope" of the projection surface TS represents a vertical length to a unit horizontal length (in the outward direction from the vehicle area R0). In other words, the "slope" at each point on the projection surface TS represents the slope of the tangent at the point. That is, the relatively high slope deviates from horizontal more than the relatively low slope deviates from horizontal As shown in FIG. 4, the normal projection surface TS1 has the vehicle area R0 that corresponds to the location of the own vehicle 9 on the horizontal plane, and a flat area R1 that is in contact with the vehicle area R0 on the horizontal plane, and a curved area R2 that is created in the area away from the vehicle area R0 in the shape that has a downward concave curve. In other wards, the normal projection surface TS1 has the flat area R1 where the distances to the vehicle area R0 are relatively short and the slope is relatively low, and the curved area R2 where the distances to the vehicle area R0 are relatively long and the slope is relatively high. The flat area R1 is created in the area that is in contact with the vehicle area R0 and surrounds the vehicle area R0. The curved area R2 is created in the outer part of the normal projection surface TS1 in the shape that the slope gradually becomes higher to the edge (in the same line shape as a quadric curve).

Here is a further description based on FIG. 3. On the projection surface TS, the data of the shot images are not projected onto the vehicle area R0 (location of the own vehicle 9) but projected onto the area outside the vehicle area R0. Hereinafter, the area where the data of the shot images are projected (area outside the vehicle area R0) on the projection surface TS is referred to as "projection subject area." On the normal projection surface TS1, the both of the flat area R1 and the curved area R2 are set as the projection subject area (refer to FIG. 4.).

Each location in the projection subject area on the projection surface TS corresponds to one of the four shot images SF, SB, SL and SR based on correspondence information such as table data. The image composer 22 projects the data of the four shot images SF, SB, SL and SR respectively onto the corresponding parts in the projection subject area.

The image composer 22 projects the data of the shot image SF captured by the front camera 5F onto a part PF corresponding to the forward area of the own vehicle 9 in the projection subject area. The image composer 22 also projects the data of the shot image SB captured by the rear camera 5B onto a part PB corresponding to the rear area of the own vehicle 9 in the projection subject area. Moreover, the image composer 22 projects the data of the shot image SL captured by the left-side camera 5L onto a part PL corresponding to the left-side area of the own vehicle 9 in the projection subject area, and projects the data of the shot image SR captured by the right-side camera 5R onto a part PR corresponding to the right-side area of the own vehicle 9 in the projection subject area.

After projecting the data of the shot images onto the respective parts of the projection subject area on the projection surface TS as above, the image composer 22 virtually creates a polygon model showing a three-dimensional shape of the own vehicle 9. The polygon model of the own vehicle 9 is located at the vehicle area R0 that is the location of the own vehicle 9 in the three-dimensional space where the projection surface TS is set.

Next, the image composer 22 sets based on the control by the image controller 20a a virtual viewpoint VP in the three-dimensional space. The image composer 22 is capable of setting the virtual viewpoint VP in an arbitrary view direction at the arbitrary position in the three-dimensional space. Then, the image composer 22 clips, as an image, only the data projected onto the area included in the prescribed view angle viewed from the set virtual viewpoint VP within the projection surface TS. The image composer 22 also renders the polygon model of the own vehicle 9 in accordance with the set virtual viewpoint VP, and superposes a two-dimensional vehicle image 90 that is a result of the rendering on the clipped image. As above, the image composer 22 generates a composite image CP that shows the own vehicle 9 and the periphery of the own vehicle 9 viewed from the virtual viewpoint VP.

In the case of a virtual viewpoint VPa set straight above the own vehicle 9 to a straight-down view direction as shown in the figure, a composite image (overview image) CPa including the overlooked own vehicle 9 and the overlooked periphery of the own vehicle 9 is generated. In the case of a virtual viewpoint VPb set left-rear above the own vehicle 9 to look down the forward area of the own vehicle 9, a composite image CPb including the own vehicle 9 and the periphery of the own vehicle 9 overlooked from the left-rear point above the own vehicle 9 is generated. The image composer 22 in the embodiment primarily sets the virtual viewpoint VPa to look straight down the own vehicle 9, as the virtual viewpoint VP. As above, the image composer 22 generates the overview image that is the composite image including the overlooked own vehicle 9 and the overlooked periphery of the own vehicle 9.

1-3. Display Image

Figure 5:
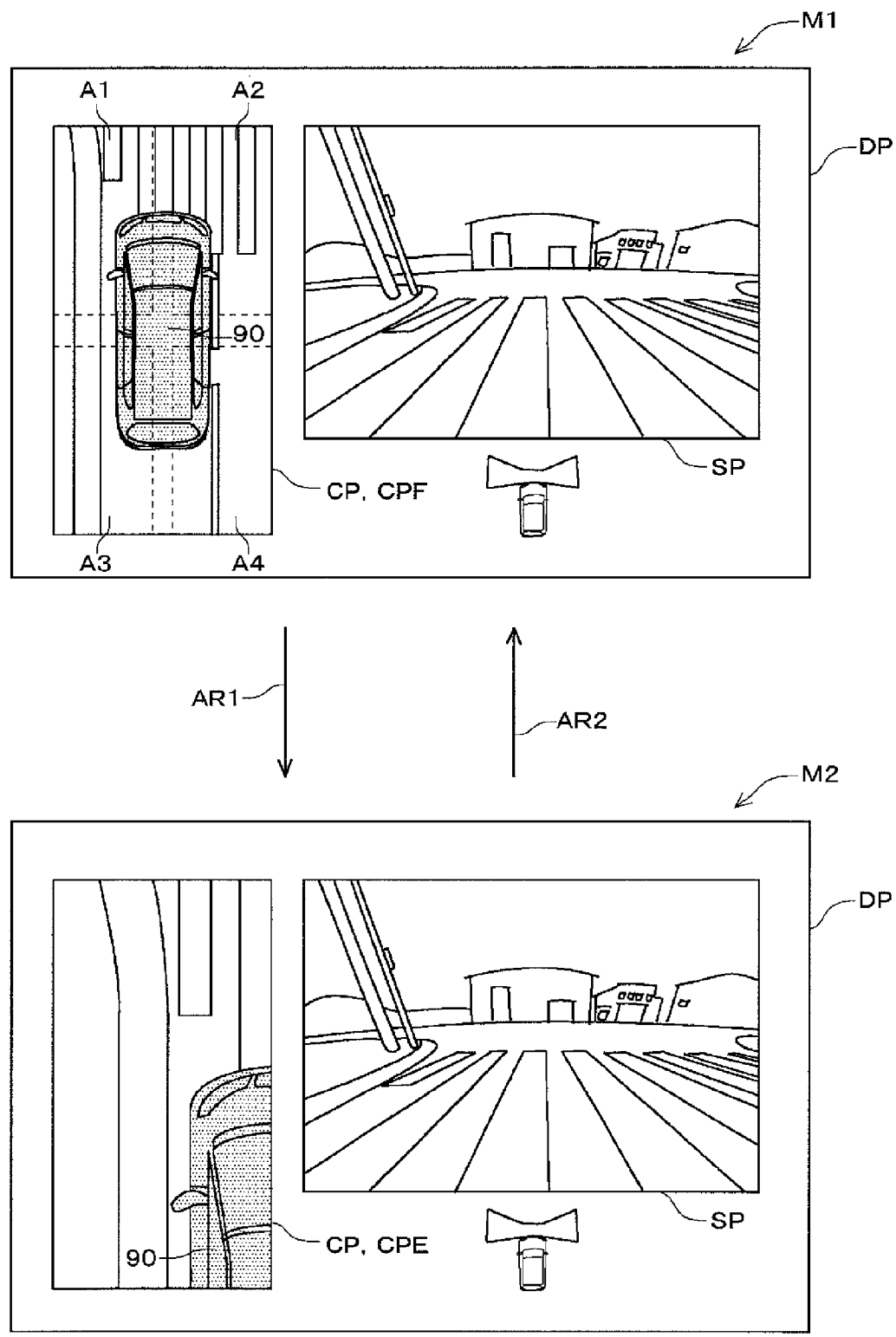
FIG. 5 shows example display images generated by an image adjuster.

Next, the display image generated by the image adjuster 23 is described. FIG. 5 shows examples of a display image DP generated by the image adjuster 23. The display image DP shown in FIG. 5 is displayed on the display 3 so that the user can look the display image DP.

As shown in FIG. 5, the display image DP includes a shot image SP and the composite image CP. The shot image SP included in the display image DP is selected based on the traveling direction of the own vehicle 9. In the case where the traveling direction of the own vehicle 9 is the forward direction, the shot image SF captured by the front camera 5F is used as the shot image SP in the display image DP. In the case where the traveling direction of the own vehicle 9 is the backward direction, the shot image SB captured by the rear camera 5B is used as the shot image SP in the display image DP. The traveling direction of the own vehicle 9 is judged by the image controller 20a based on the signal indicating the shift position transmitted by the shift-position sensor 91.

The composite image CP included in the display image DP is the overview image showing the periphery of the own vehicle 9 looked down from the viewpoint set straight above the own vehicle 9. The form of the composite image CP is changed based on the control by the image controller 20a, by use of a display mode. The display mode includes a normal mode M1 and an enlarged mode M2.

As shown in the upper figure of FIG. 5, a full composite image CPF showing the whole periphery of the own vehicle 9 is displayed in the normal mode M1. As shown in the lower figure of FIG. 5, an enlarged composite image CPE showing the partially-enlarged vicinity of the own vehicle 9 is displayed in the enlarged mode M2. The user can arbitrarily change the display mode. When the image display system 10 is started, the display mode is in the normal mode M1.

When the user touches one point of the full composite image CPF displayed on the touch panel 31 in the normal mode M1, the display mode is changed to the enlarged mode M2 (shown by an arrow AR1). When the user touches an upper-left area A1 in the full composite image CPF, the enlarged composite image CPE that shows an enlarged forward-left vicinity of the own vehicle 9 is displayed in the enlarged mode M2. When the user touches an upper-right area A2 in the full composite image CPF, the enlarged composite image CPE that shows an enlarged forward-right vicinity of the own vehicle 9 is displayed in the enlarged mode M2. When the user touches a lower-left area A3 in the full composite image CPF, the enlarged composite image CPE that shows an enlarged rear-left vicinity of the own vehicle 9 is displayed in the enlarged mode M2. When the user touches a lower-right area A4 in the full composite image CPF, the enlarged composite image CPE that shows an enlarged rear-right vicinity of the own vehicle 9 is displayed in the enlarged mode M2.

When the user touches one part of the enlarged composite image CPE displayed on the touch panel 31 in the enlarged mode M2, the display mode is changed to the normal mode M1 (shown by an arrow AR2).

As above, the user can arbitrarily switch between the full composite image CPF and the enlarged composite image CPE as the composite image CP for display by operating the display mode for change. Therefore, the user can find whether and where an object exists in the whole periphery of the own vehicle 9 in the normal mode M1, and can check the object on the enlarged image of the object by changing the display mode to the enlarged mode M2, if needed. In most cases, when finding the object existing in the vicinity of the own vehicle 9, the user changes the display mode from the normal mode M1 to the enlarged mode M2 to check the object closely.

1-4. Use of Normal Projection Surface

Generation of the composite image CP is described on the assumption that only the normal projection surface TS1 (refer to FIG. 3 and FIG. 4) described above is used. In such a case, when looking at the generated composite image CP, the user may feel that the object existing in the vicinity of the own vehicle 9 is away from the location of the own vehicle 9. Hereafter, the principle is described.

Figure 6:
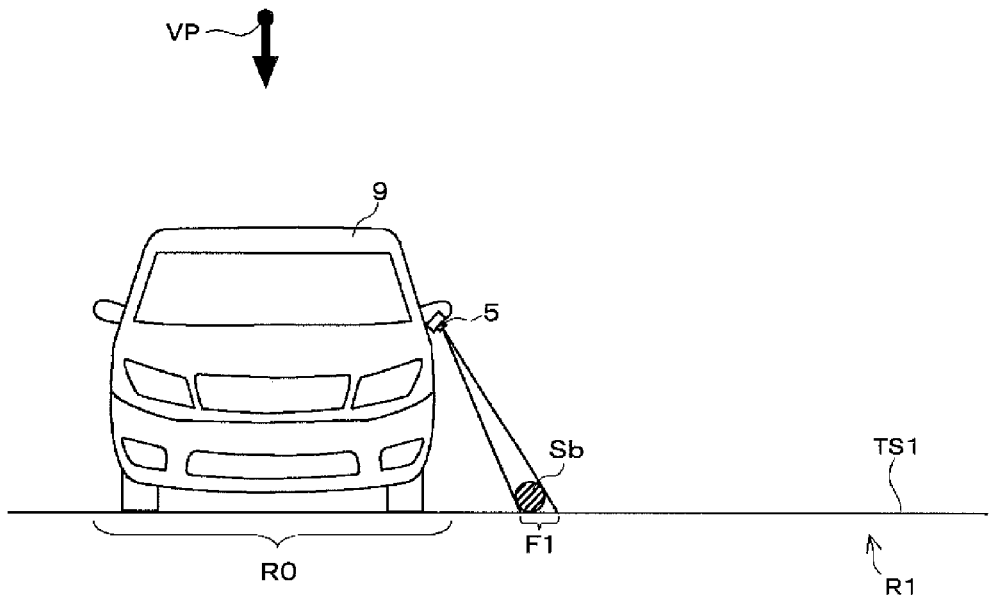
FIG. 6 shows a location where an image of an object is projected by use of the normal projection surface.
Figure 7:
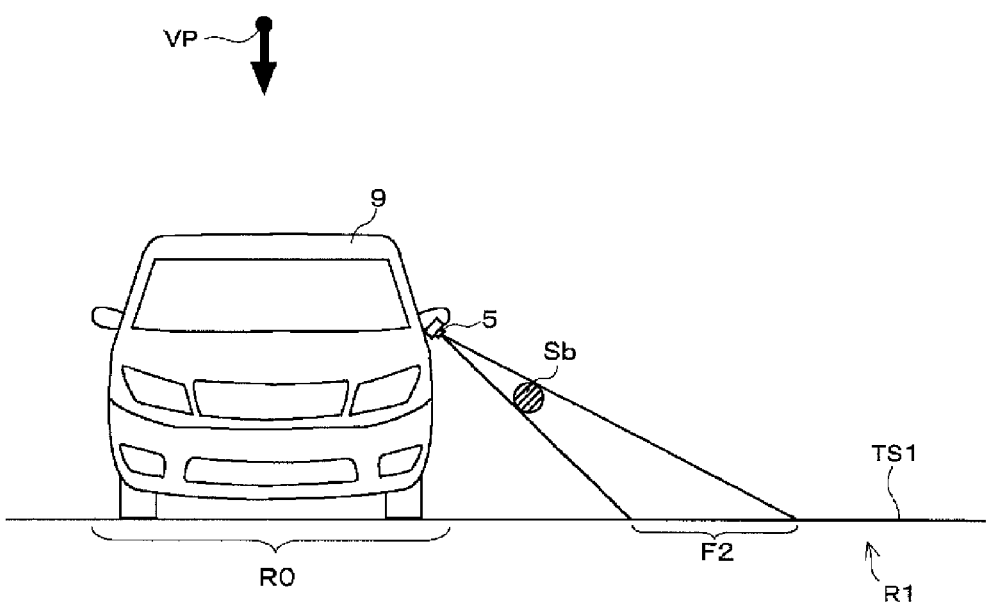
FIG. 7 shows a location where an image of another object is projected by use of the normal projection surface.

Each of FIG. 6 and FIG. 7 shows the location where the image of an object Sb existing in the vicinity of the own vehicle 9 is projected by use of the normal projection surface TS1 for generation of the composite image CP. For the sake of explanation, each of FIG. 6 and FIG. 7 shows the actual own vehicle 9 and the actual object Sb respectively at the corresponding locations in the three-dimensional space where the virtual projection surface TS is set. FIG. 6 shows the actual object Sb that exists in contact with a road. FIG. 7 shows the actual object Sb that exists above the road at a distance.

The image of the object Sb included in the shot image of the object Sb captured by one of the plurality of cameras 5 is projected onto the location where the lines connecting the location of the one of the plurality of cameras 5 and the location of the object Sb intersect the normal projection surface TS1. In either case of FIG. 6 and FIG. 7, since the object Sb exists in the vicinity of the own vehicle 9, the image of the object Sb is projected onto the flat area R1 that is the horizontal plane on the normal projection surface TS1.

As shown in FIG. 6, the image of the actual object Sb that exists in contact with the road is projected onto a projection location F1 in the figure. That is, the image of the object Sb is projected onto substantially the same location as the corresponding location of the object Sb in the three-dimensional space. Therefore, the image of the object Sb in contact with the road is projected onto the vicinity of the vehicle area R0 that corresponds to the location of the own vehicle 9. As a result, even in the composite image CP that is generated by use of the normal projection surface TS1, the image of the object Sb is shown in the vicinity of the vehicle image 90 showing the own vehicle 9.

On the other hand, as shown in FIG. 7, the image of the actual object Sb that exists above the road at a distance is projected onto a projection location F2 in the figure. That is, the image of the object Sb is projected outside the corresponding location of the object Sb in the three-dimensional space. Therefore, the image of the object Sb above the road at a distance is projected onto the location away from the vehicle area R0 that corresponds to the location of the own vehicle 9. As a result, in the composite image CP that is generated by use of the normal projection surface TS1, the image of the object Sb is shown away from the vehicle image 90 showing the own vehicle 9. When looking at the composite image CP, the user may feel that the object Sb exists farther away from the own vehicle 9 than in reality, and may feel that the distance between the own vehicle 9 and the object Sb is longer than in reality.

Particularly, a bumper of another vehicle corresponds to the object that exists above the road at a distance shown in FIG. 7. Most vehicle bumpers protrude from vehicle bodies, and the bottoms of the most bumpers are not in contact with the road. Thus, the image of the vehicle bumper is shown as the image of the object existing above the road at a distance in the shot image captured by the plurality of cameras 5. Therefore, in some cases when the user starts the own vehicle 9 in a parallel parking state, a bumper 99a of an other vehicle 99 at a time when the own vehicle 9 is close to the other vehicle 99 as shown in FIG. 8, corresponds to the object that exists above the road at a distance shown in FIG. 7.

Figure 8:
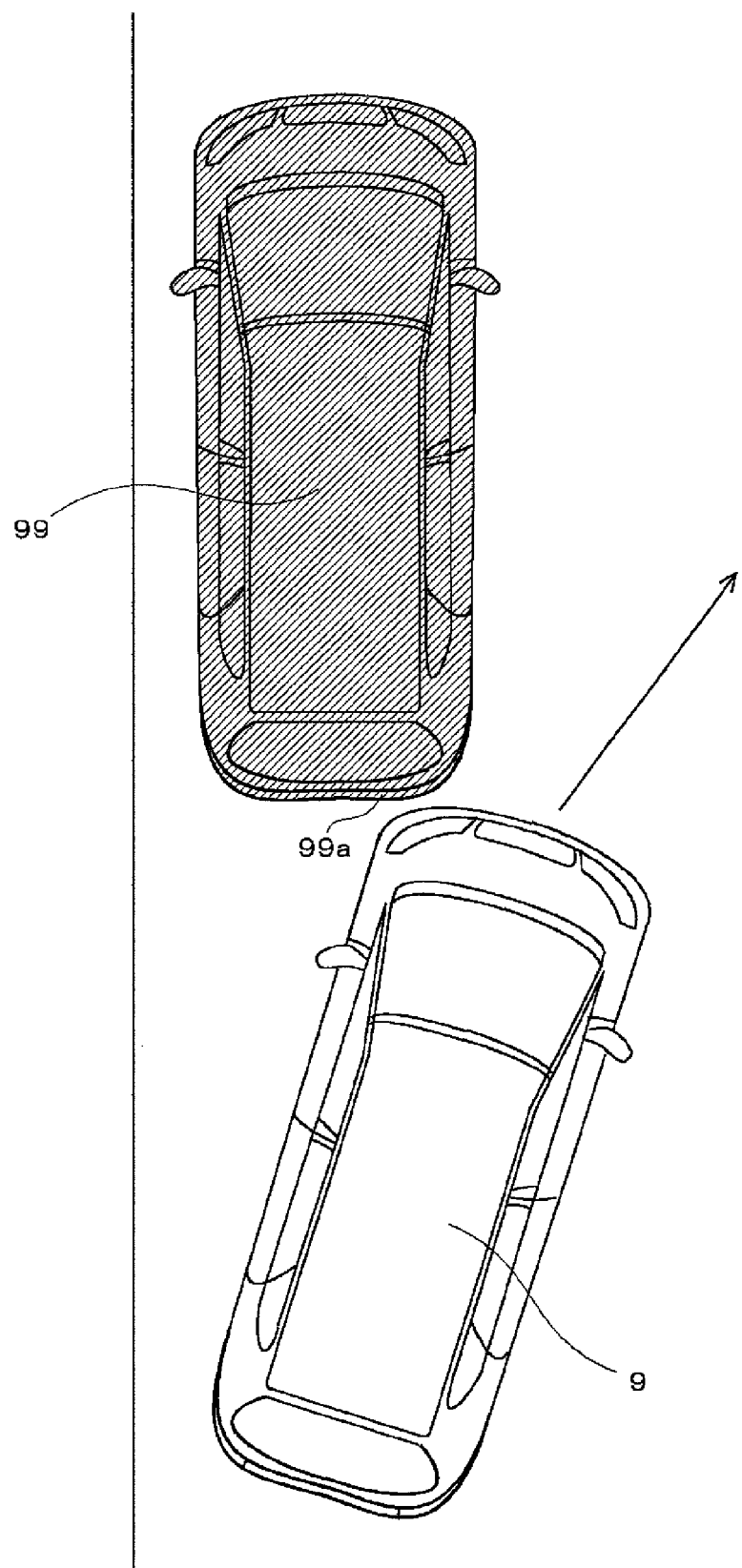
FIG. 8 shows a state where the own vehicle is close to another vehicle.
Figure 9:
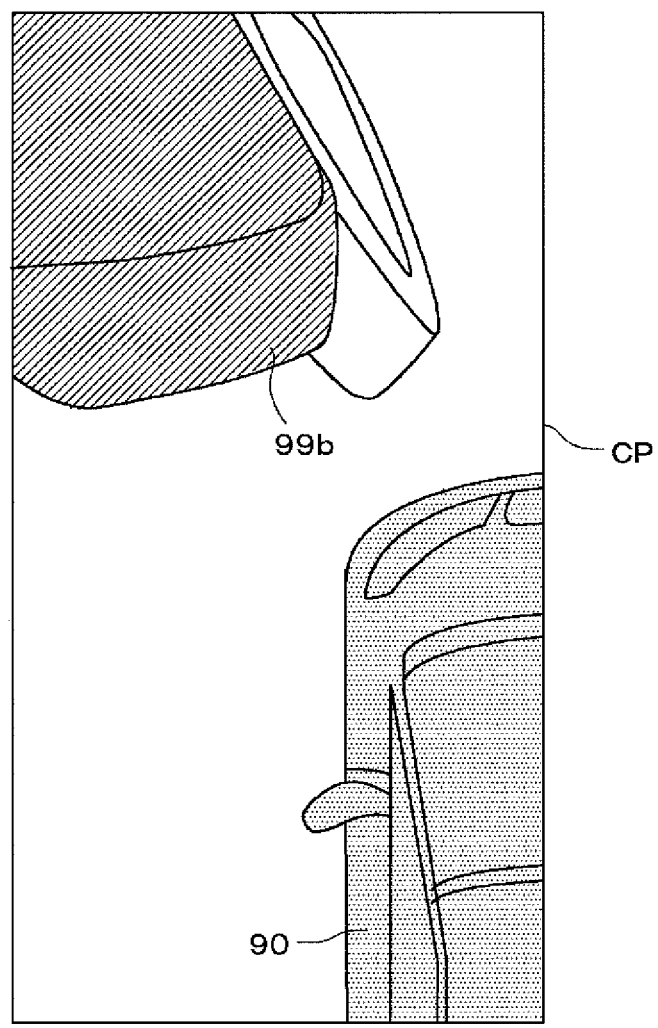
FIG. 9 shows an example composite image generated by use of the normal projection surface.

FIG. 9 shows an example of the composite image CP that is generated by use of the normal projection surface TS1 based on the shot images captured in the case shown in FIG. 8. The composite image CP is the enlarged composite image that shows an enlarged forward-left vicinity of the own vehicle 9.

In the composite image CP shown in FIG. 9, an image 99b of the bumper 99a of the other vehicle 99 is shown away from the vehicle image 90. Therefore, when looking at the composite image CP, the user may feel that the bumper 99a of the other vehicle 99 is away from the own vehicle 9. As a result, there is a possibility that the user drives the own vehicle 9, having misperception of the location relation between the own vehicle 9 and the bumper 99a, because the user feels the distance between the own vehicle 9 and the bumper 99a of the other vehicle 99 longer than in reality as shown in FIG. 8.

The enlarged composite image shows only a part of the enlarged vicinity of the own vehicle 9, as in FIG. 9. Thus, especially when the enlarged composite image is used as the composite image CP, the distance between the image of the object (the image 99b of the bumper 99a) and the vehicle image 90 is more emphasized. Therefore, when looking at such an enlarged composite image, the user is more likely to feel the object (bumper 99a) being away from the own vehicle 9.

1-5. Use of Special Projection Surface

To solve such a problem, the image display system 10 of the embodiment uses a special projection surface that is one of the projection surfaces, for generation of the enlarged composite image. The special projection surface differs in shape from the normal projection surface TS1. Hereafter, the special projection surface is described.

Figure 10:
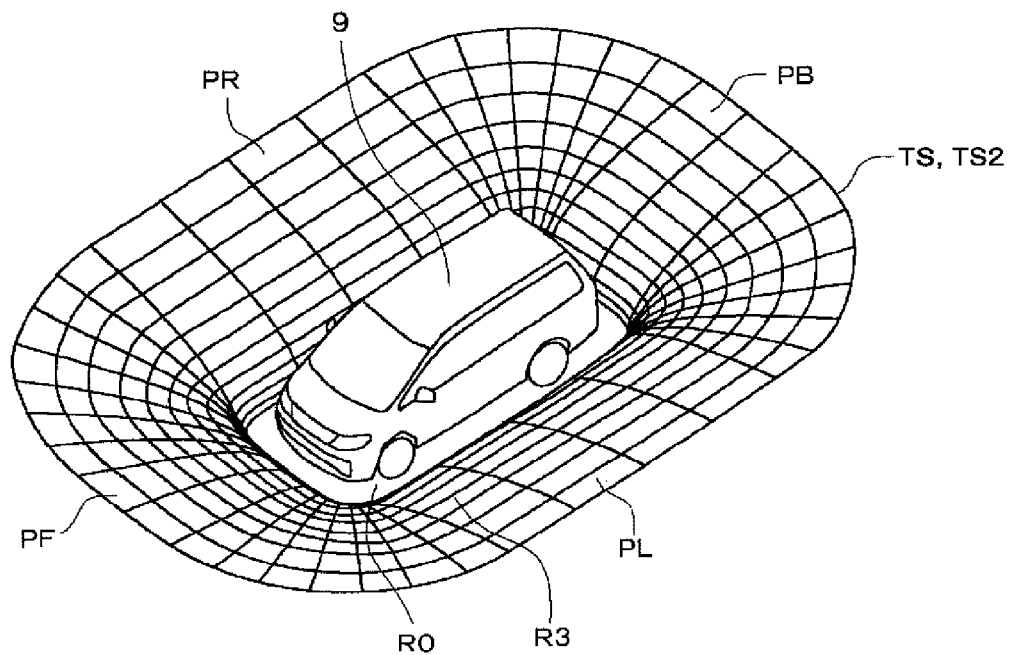
FIG. 10 shows a shape of a special projection surface.

FIG. 10 shows the shape of a special projection surface TS2. As shown in the figure, the special projection surface TS2 has the vehicle area R0 that corresponds to the location of the own vehicle 9 on the horizontal plane, and a curved area R3 that is the projection subject area created in the shape surrounding the vehicle area R0 and having an upward convex curve. The curved area R3 includes the part PF that is opposed to the front face of the own vehicle 9, the part PB that is opposed to the back face of the own vehicle 9, the part PL that is opposed to the left-side face of the own vehicle 9, and the part PR that is opposed to the right-side face of the own vehicle 9.

Figure 11:
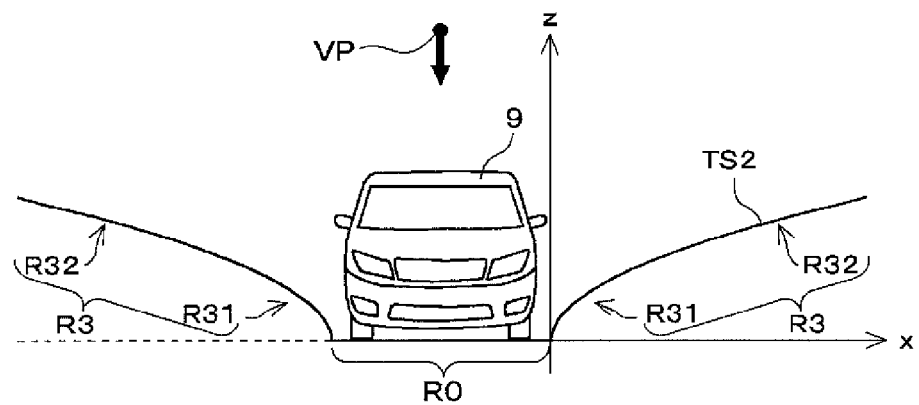
FIG. 11 shows a cross-section view of the special projection surface that is cut along side-to-side direction of the own vehicle.

FIG. 11 shows a cross-section view of the special projection surface TS2 that is cut along side-to-side direction of the own vehicle 9. As shown in the figure, the curved area R3 is created outside the vehicle area R0, and curves in a shape that the area closer to the vehicle area R0 (location of the own vehicle 9) is steeper (higher in slope) and the area farther away from the vehicle area R0 is gentler. In other words, the curved area R3 includes an area R31 where the distances from the vehicle area R0 are relatively short and the slope is relatively high, and an area R32 where the distances from the vehicle area R0 are relatively long and the slope is relatively low. The whole area covering the area R31 and the area R32 that are in contact with each other forms the curved area R3 having gradually-decreasing slope (in the same line shape as a quadric curve).

As shown in FIG. 11, when a coordinate is set with an origin at the boundary point between the vehicle area R0 and the curved area R3 (projection subject area), a horizontal x axis (positive values in the direction away from the vehicle area R0), and a vertical z axis (positive values in an upper direction), the cross-section shape of the curved area R3, for example, is expressed in the following formula (1).

$$z = a \cdot \mathrm{sqrt}(x) \qquad (1)$$

Where in the formula (1), "sqrt ( )" represents a function that returns the square root of an argument, and "a" represents a coefficient defining the slope, high or low, of the curved area R3. That is, the larger the coefficient "a" becomes, the higher the slope of the curved area R3 becomes.

Figure 12:
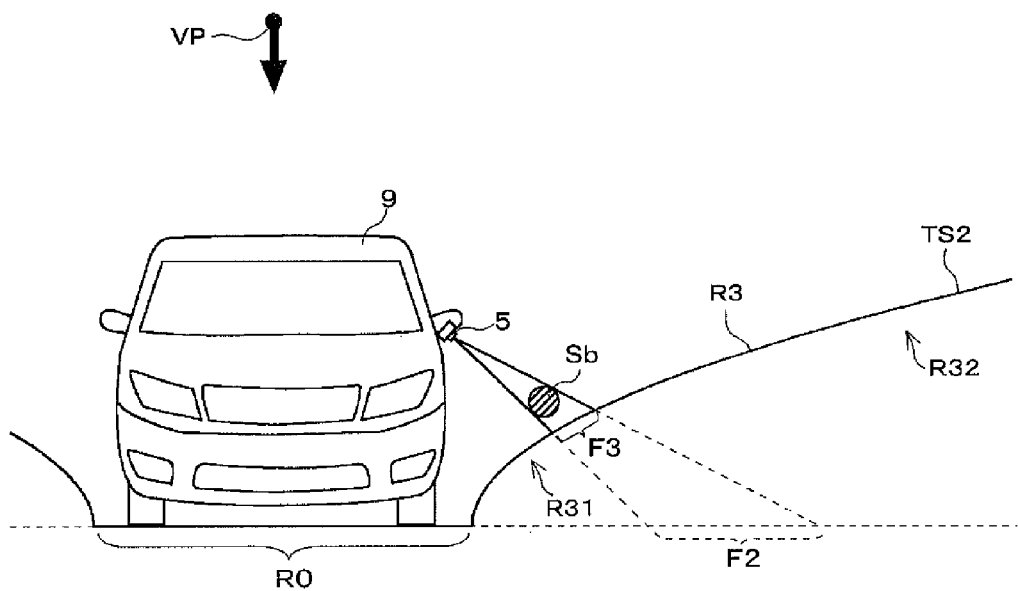
FIG. 12 shows a location where the image of the object is projected by use of the special projection surface.

FIG. 12 shows the location where the image of the object Sb existing in the vicinity of the own vehicle 9 is projected by use of the special projection surface TS2 for generation of the composite image CP. FIG. 12 shows, as with FIG. 7, the actual object Sb that exists above the road at a distance.

In this case also, the image of the object Sb is projected onto the location where the lines connecting the location of one of the plurality of cameras 5 and the location of the object Sb intersect the special projection surface TS2. Since the object Sb exists in the vicinity of the own vehicle 9, the image of the object Sb is projected onto the area R31 that is closer to the vehicle area R0 in the curved area R3. That is, the image of the object Sb is projected onto the area R31 having relatively higher slope of the curved area R3.

Therefore, as shown in FIG. 12, the image of the object Sb that is located at the same location as in FIG. 7 is projected onto a projection location F3 in the figure. The image of the object Sb is projected, by use of the special projection surface TS2, onto the projection location F3 that is closer to the vehicle area R0 than the projection location F2 onto which the image of the object Sb is projected by use of the normal projection surface TS1 (refer to FIG. 7) is. Therefore, by use of the special projection surface TS2, the object Sb existing above the road even at a distance is shown in the vicinity of the vehicle image 90 in the composite image CP.

Figure 13:
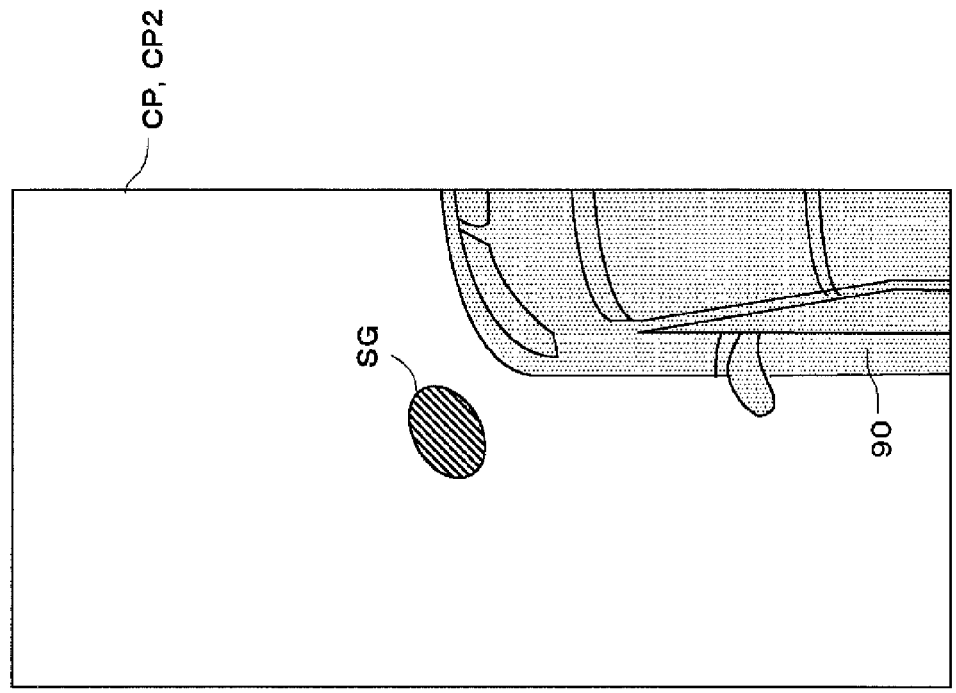
FIG. 13 shows two composite images generated in the same situation.
Figure 13:
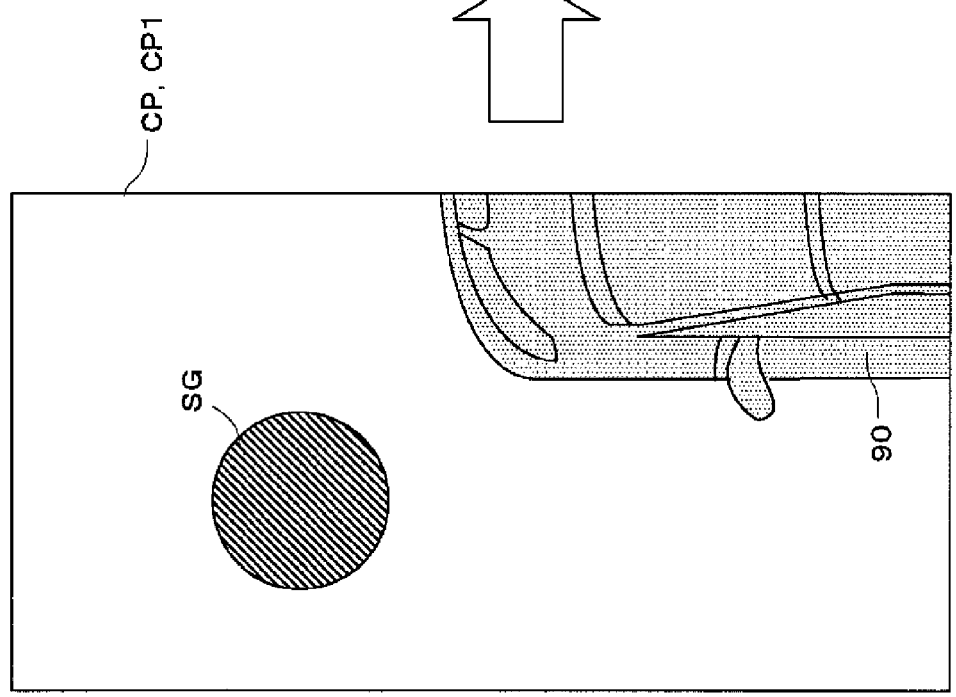

FIG. 13 shows the two composite images CP generated in the same situation where the object exists above the road at a distance in the vicinity of the own vehicle 9. The left figure in FIG. 13 shows a composite image CP1 generated by use of the normal projection surface TS1. The right figure in FIG. 13 shows a composite image CP2 generated by use of the special projection surface TS2. Each of the composite images CP1 and CP2 includes an image SG of the same object.

The comparison between the composite image CP1 and the composite image CP2 reveals that the image SG of the object shown in the composite image CP2 by use of the special projection surface TS2 is closer to the vehicle image 90 than the image SG of the object shown in the composite image CP1 by use of the normal projection surface TS1.

Therefore, since the distance between the vehicle image 90 and the image of the object in the composite image CP2 is shorter than the distance in the composite image CP1, the degree to which the user feels that the object is away from the own vehicle 9 when looking at the composite image CP2 can be reduced. As a result, since this prevents the user from misperceiving the location relation between the own vehicle 9 and the object, the user can drive the own vehicle 9 safely.

The image of the shot object projected onto the curved area R3 of the special projection surface TS2 is more compressed to the side of the vehicle area R0 compared to the image projected onto the flat area R1 of the normal projection surface TS1. The image projected onto the area having higher slope of the curved area R3 is more highly compressed. There is a possibility that too much compression may create a feeling of strangeness on the distorted image of the shot object in the composite image CP.

As shown in FIG. 11, the curved area R3 on the special projection surface TS2 used in the embodiment has the shape that the farther the area is away from the vehicle area R0, the lower the slope becomes. The image of the shot object existing in the vicinity of the own vehicle 9 is projected onto the area R31 having relatively high slope within the curved area R3. Thus, the degree of compression is high. On the other hand, the image of the shot object existing away from the own vehicle 9 is projected onto the area R32 having relatively low slope within the curved area R3. Thus, the degree of compression is lower. Since the image of the shot object existing away from the own vehicle 9 is less compressed in the composite image CP, the image of the shot object is expressed without much feeling of strangeness.

Figure 14:
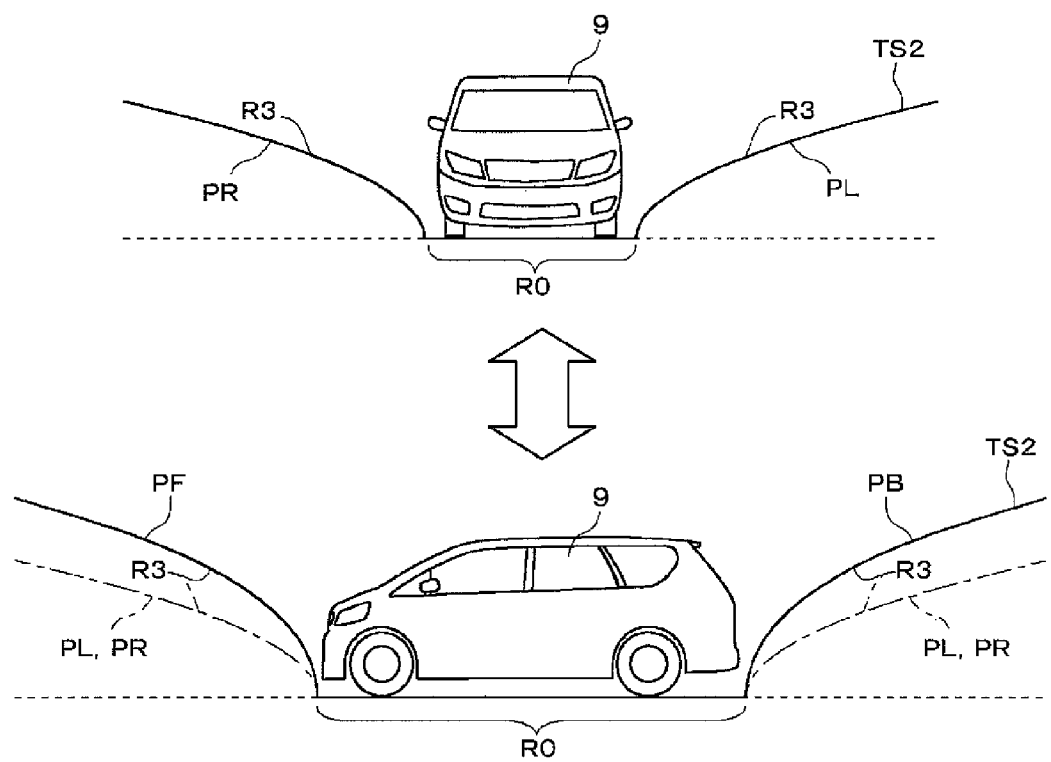
FIG. 14 shows other cross-section views of the special projection surface.

Moreover, the slope of the curved area R3 on the special projection surface TS2 varies according to the following two group; one is the parts PL and PR which are respectively opposed to the side faces of the own vehicle 9, and the other is the parts PF and PB which are respectively opposed to the front face and the back face of the own vehicle 9. The upper figure in FIG. 14 shows the cross-section view of the special projection surface TS2 that is cut along side-to-side direction of the own vehicle 9. The lower figure in FIG. 14 shows the cross-section view of the special projection surface TS2 that is cut along front-back direction of the own vehicle 9. The lower figure in FIG. 14 also shows, with dashed-dotted lines for comparison, the shapes of the parts PL and PR respectively opposed to the side faces of the own vehicle 9 within the curved area R3.

As shown in FIG. 14, the slope of the parts PF and PB which are respectively opposed to the front face and the back face of the own vehicle 9 within the curved area R3 is higher than the slope of the parts PL and PR which are respectively opposed to the side faces of the own vehicle 9. The slope of the curved area R3 is specified by the coefficient "a" in the formula (1) described above. Moreover, the slope of the area between the two parts having different slope in the curved area R3 (for example, the area between the part PF opposed to the front face and the part PL opposed to the left-side face) varies gradually.

Figure 15:
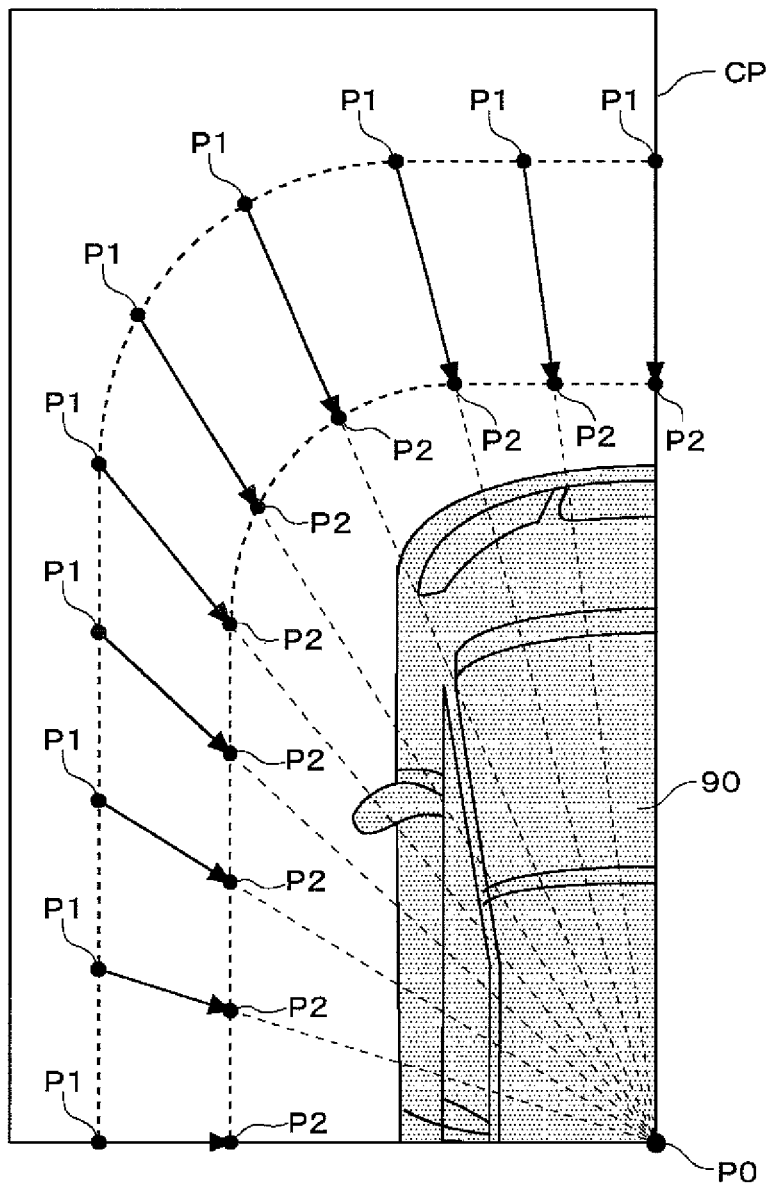
FIG. 15 shows the locations each at which an image on the point of a shot object is shown in the composite image.

FIG. 15 shows the locations each at which the image on the point of the shot object existing in the vicinity of the own vehicle 9 is shown in the composite image CP. A point P1 in the figure shows the location of the image shown by use of the normal projection surface TS1. A point P2 shows the location of the image shown by use of the special projection surface TS2. The arrow connecting between the point P1 and the point P2 expresses that the point P1 and the connected point P2 show the same point on the shot object. The image on every point (point P2) of the shot object by use of the special projection surface TS2 is shown closer to a center point P0 of the vehicle area R0 (vehicle image 90) than the image on the corresponding point (point P1) by use of the normal projection surface TS1 is.

The image of the object projected onto the area having higher slope in the curved area R3 on the special projection surface TS2 is more compressed. Thus, such an image is shown closer to the center point P0 of the vehicle area R0. As above, in the curved area R3, the slope of the part PF opposed to the front face of the own vehicle 9 is higher than the slope of the part PL opposed to the left-side face of the own vehicle 9. Therefore, as shown in FIG. 15, in the case by use of the special projection surface TS2, the image on the point in the forward area of the own vehicle 9 is shown much closer to the vehicle area R0 (vehicle image 90) than the image on the point in the side area of the own vehicle 9 is.

As above, the curved area R3 is created so that the parts PF and PB that are respectively opposed to the front face and the back face and that are in the traveling direction of the own vehicle 9 have relatively higher slope. This enables the image of the object with a possible collision with the own vehicle 9 to be shown in the area much closer to the vehicle image 90. As a result, the degree to which the user feels, when looking at the composite image CP, that the object is away from the own vehicle 9 is largely reduced, and this effectively prevents the own vehicle 9 from colliding with the object.

On the other hand, there is a possibility that too much compression on the image of the object may create a feeling of strangeness. Therefore, the curved area R3 is created so that the parts PL and PR that are respectively opposed to the side faces and that are not in the traveling direction of the own vehicle 9 have relatively low slope. This reduces the feeling of strangeness created by the compression on the image of the object with less-possible collision with the own vehicle 9.

1-6. Flow of Processing

The use of the special projection surface TS2 as above reduces the degree to which the user feels that the object is away from the own vehicle 9 when looking at the composite image CP. On the other hand, the use of the special projection surface TS2 may give the user the feeling of strangeness on the distorted image of the shot object in the composite image CP due to the compression on the image of the shot object. Therefore, the image display system 10 uses the special projection surface TS2 when displaying the enlarged composite image CPE at a time when it is highly possible that an object exists in the vicinity of the own vehicle 9, and uses the normal projection surface TS1 when displaying the full composite image CPF. The flow of such processing on the image display system 10 is described below.

Figure 16:
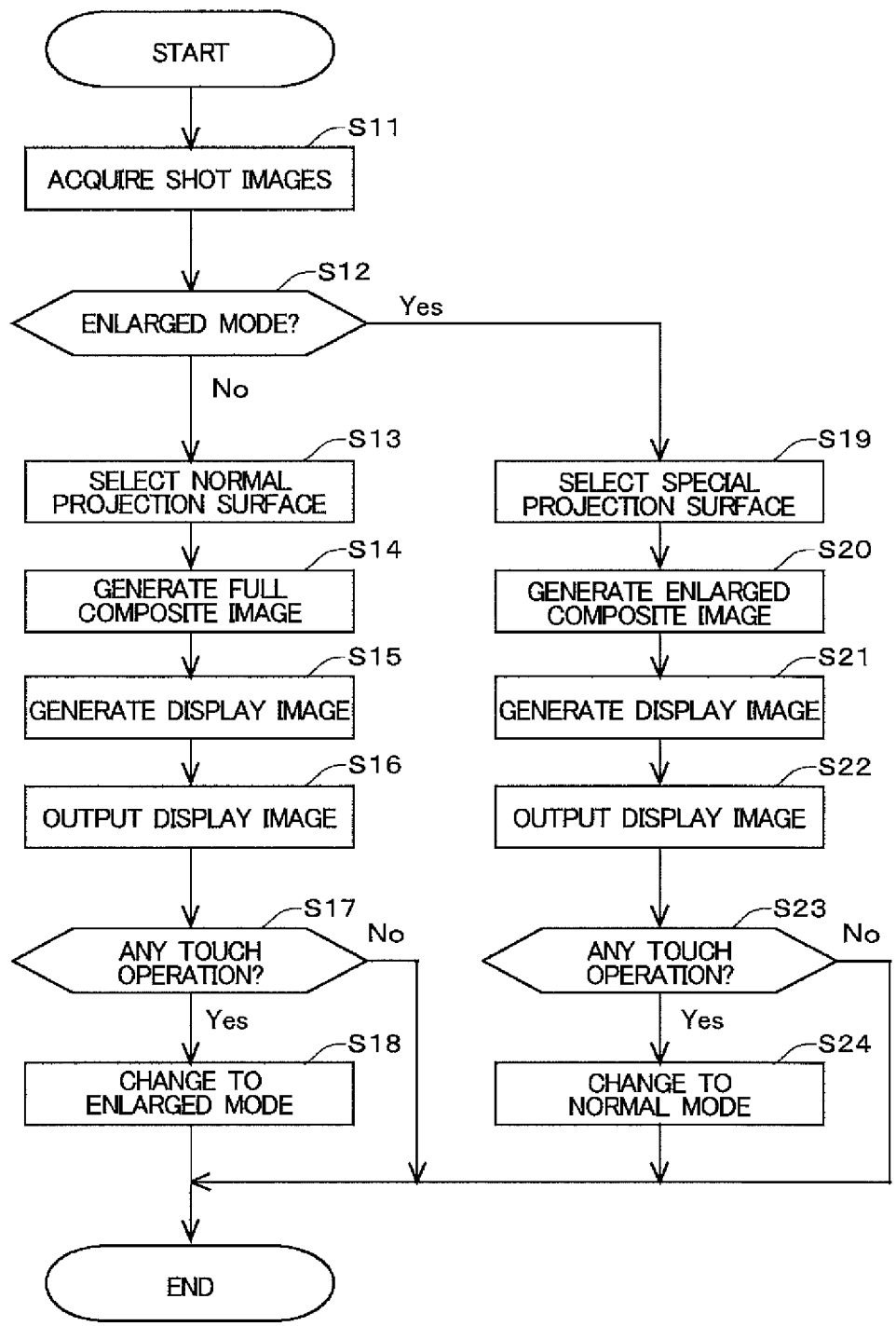
FIG. 16 shows a processing flow on the image display system of the first embodiment.

FIG. 16 shows the flow of the processing on the image display system 10. The processing shown in FIG. 16 is started when the user operates the operation button 4 for starting the processing. The display mode at a time of start of the processing is the normal mode M1 for displaying the full composite image CPF. The processing shown in FIG. 16 is repeated at predetermined intervals (for example, at intervals of 1/30 second) until when the user operates the operation button 4 for stopping the processing.

Each of the four cameras 5 disposed on the own vehicle 9 captures the shot image of the periphery of the own vehicle 9. Then, the image acquisition part 21 acquires the four shot images captured respectively by the four cameras 5 (step S11).

Next, the image controller 20a judges whether the display mode is the normal mode M1 or the enlarged mode M2 (step S12).

When the display mode is the normal mode M1 (No at the step S12), the image composer 22 selects the normal projection surface TS1 as the projection surface TS for generation of the composite image CP, based on the control by the image controller 20a (step S13). The image composer 22 reads out from the memory 27 the projection surface data 27b corresponding to the normal projection surface TS1 for obtaining the shape of the normal projection surface TS1.

Next, the image composer 22 generates, as the composite image CP by use of the normal projection surface TS1, the full composite image CPF that shows the whole periphery of the own vehicle 9 viewed from the virtual viewpoint (step S14). The image composer 22 projects the data of the four shot images onto the projection subject area (the flat area R1 and the curved area R2) of the normal projection surface TS1, and generates the full composite image CPF by use of the data projected onto the normal projection surface TS1.

Next, the image adjuster 23 generates the display image DP for display on the display 3 (step S15). The image adjuster 23 generates the display image DP by use of the full composite image CPF generated by the image composer 22 and the shot image acquired by the image acquisition part 21. The image adjuster 23 selects the shot image corresponding to the traveling direction of the own vehicle 9 for generation of the display image DP, based on the control by the image controller 20a.

Next, the image output part 24 outputs to the display 3 the display image DP generated by the image adjuster 23 (step S16). Then, the display image DP including the full composite image CPF is displayed on the display 3.

Next, the image controller 20a judges whether the user makes a touch operation to change the display mode, based on the operation signal received by the operation receiver 25 (step S17).

When the touch operation is not made (No at the step S17), the image controller 20a holds the display mode in the normal mode M1. When the touch operation is made (Yes at the step S17), the image controller 20a changes the display mode from the normal mode M1 to the enlarged mode M2 for displaying the enlarged composite image CPE showing the enlarged image of the area where the user touches (step S18).

In the case when the display mode is the enlarged mode M2 at the step S12 (Yes at the step S12), the image composer 22 selects the special projection surface TS2 as the projection surface TS for generation of the composite image CP, based on the control by the image controller 20a (step S19). The image composer 22 reads out from the memory 27 the projection surface data 27b corresponding to the special projection surface TS2 for obtaining the shape of the special projection surface TS2.

Next, the image composer 22 generates, as the composite image CP by use of the special projection surface TS2, the enlarged composite image CPE that shows the partially-enlarged vicinity (in the area specified by the user) of the own vehicle 9 viewed from the virtual viewpoint (step S20). The image composer 22 projects the data of the four shot images onto the projection subject area (the curved area R3) of the special projection surface TS2, and generates the enlarged composite image CPE by use of the data projected onto the special projection surface TS2.

Next, the image adjuster 23 generates the display image DP for display on the display 3 (step S21). The image adjuster 23 generates the display image DP by use of the enlarged composite image CPE generated by the image composer 22 and the shot image acquired by the image acquisition part 21. The image adjuster 23 selects the shot image corresponding to the traveling direction of the own vehicle 9 for generation of the display image DP, based on the control by the image controller 20a.

Next, the image output part 24 outputs to the display 3 the display image DP generated by the image adjuster 23 (step S22). Then, the display image DP including the enlarged composite image CPE is displayed on the display 3.

Next, the image controller 20a judges whether the user makes the touch operation to change the display mode, based on the operation signal received by the operation receiver 25 (step S23).

When the touch operation is not made (No at the step S23), the image controller 20a holds the display mode in the enlarged mode M2. When the touch operation is made (Yes at the step S23), the image controller 20a changes the display mode from the enlarged mode M2 to the normal mode M1 for displaying the full composite image CPF showing the whole periphery of the own vehicle 9 (step S24).

As above, on the image display system 10 of the first embodiment, the image acquisition part 21 acquires the plurality of shot images of the periphery of the own vehicle 9 captured by the plurality of cameras 5 disposed on the own vehicle 9. The image composer 22 projects the data of the plurality of shot images onto the virtual projection surface TS corresponding to the periphery of the own vehicle 9, and generates the composite image CP showing the periphery of the own vehicle 9 viewed from the virtual viewpoint by use of the data projected onto the projection surface TS. Then, the image composer 22 selectively uses the special projection surface TS2 including the curved area R3 that is created in the shape having an upward convex curve, as one of the projection surfaces TS. The curved area R3 includes the area R31 where the distances from the location of the own vehicle 9 are relatively short and the slope is relatively high, and the area R32 where the distances from the location of the own vehicle 9 are relatively long and the slope is relatively low.

Therefore, the image of the object existing in the vicinity of the own vehicle 9 is projected onto the area R31 having higher slope in the curved area R3 of the special projection surface TS2. This enables the image of the object to be shown at the location closer to the own vehicle 9, which reduces the degree to which the user feels that the object is away from the own vehicle 9 when looking at the composite image CP.

Within the curved area R3 of the special projection surface TS2, the slope of the parts PF and PB is higher than the slope of the parts PL and PR, the parts PF and PB being respectively opposed to the front face and the back face of the own vehicle 9, the parts PL and PR being respectively opposed to the side faces of the own vehicle 9. As above, the curved area R3 is created so that the parts PF and PB that are respectively opposed to the front face and the back face and that are in the traveling direction of the own vehicle 9 have higher slope. This largely reduces the degree to which the user feels that the object with a possible collision with the own vehicle 9 is away from the own vehicle 9.

The image composer 22 selectively uses the plurality of projection surfaces including the normal projection surface TS1 and the special projection surface TS2. Thus, the image composer 22 is capable of generating the composite image CP in a suitable form in accordance with the conditions. Particularly for generating the full composite image CPF, the image composer 22 uses the normal projection surface TS1. Thus, the full composite image CPF with less feeling of strangeness as a whole can be generated. On the other hand, for generating the enlarged composite image CPE, the image composer 22 uses the special projection surface TS2. On such an enlarged image of the object, the degree to which the user feels that the object is away from the own vehicle 9 can be effectively reduced.

2. Second Embodiment

Next, the second embodiment is described. The configuration and the processing on an image display system 10 of the second embodiment are substantially the same as the ones of the first embodiment. Thus, the points different from the first embodiment are primarily described. The image display system 10 of the first embodiment changes the display mode in accordance with the operations by the user. On the other hand, the image display system 10 of the second embodiment, having a function to detect an object existing in the periphery of an own vehicle 9, provides various display modes in accordance with the result of the detection of the object.

Figure 17:
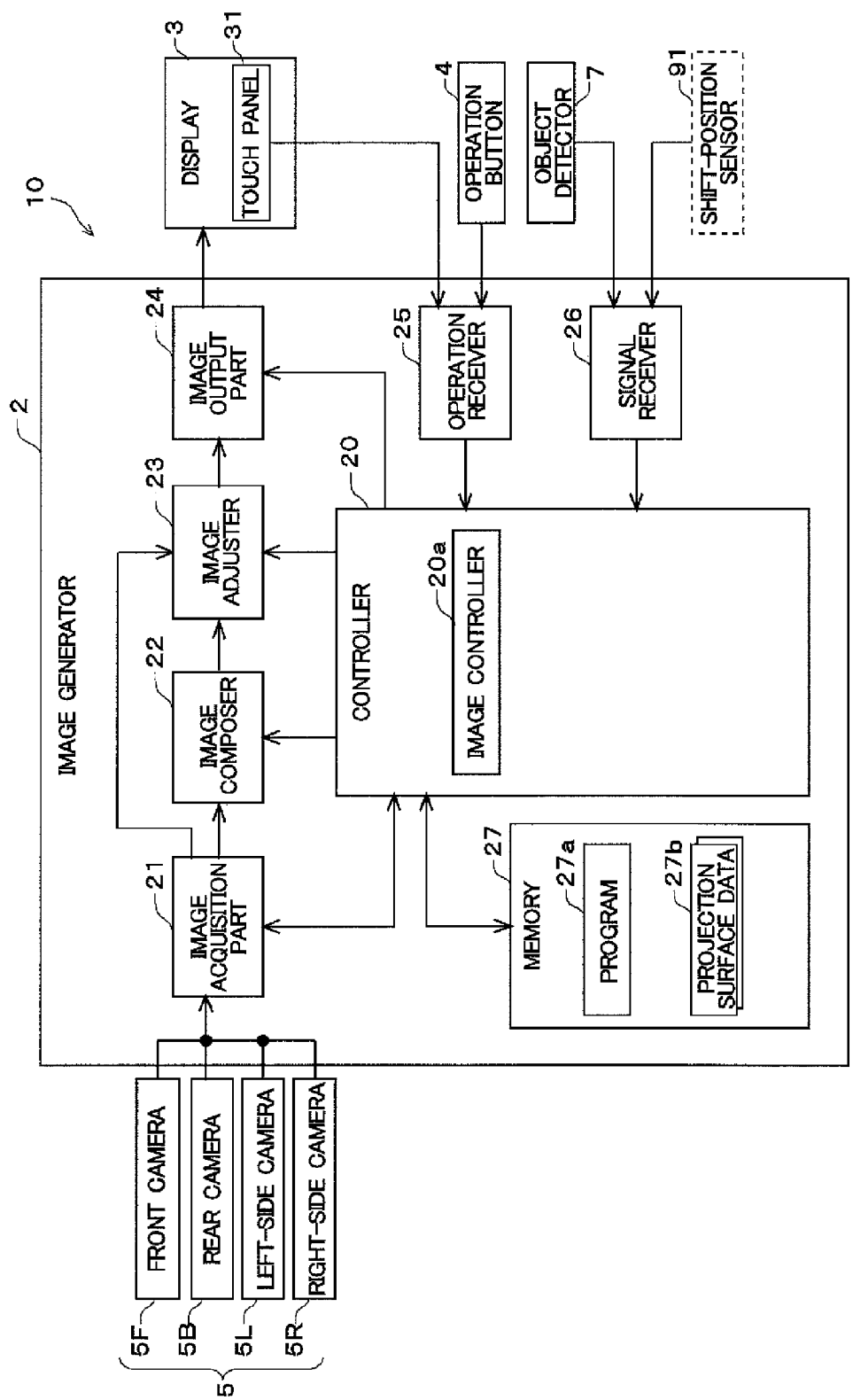
FIG. 17 shows a configuration of an image display system of the second embodiment.

FIG. 17 shows the configuration of the image display system 10 of the second embodiment. The image display system 10 of the second embodiment further includes an object detector 7 in addition to the configuration of the first embodiment shown in FIG. 1. The object detector 7 detects the object existing in the periphery of the own vehicle 9. The result signal showing the result of detection of the object detected by the object detector 7 is entered to an image generator 2. A signal receiver 26 of the image generator 2 receives the result signal, and enters the received result signal to a controller 20.

Figure 18:
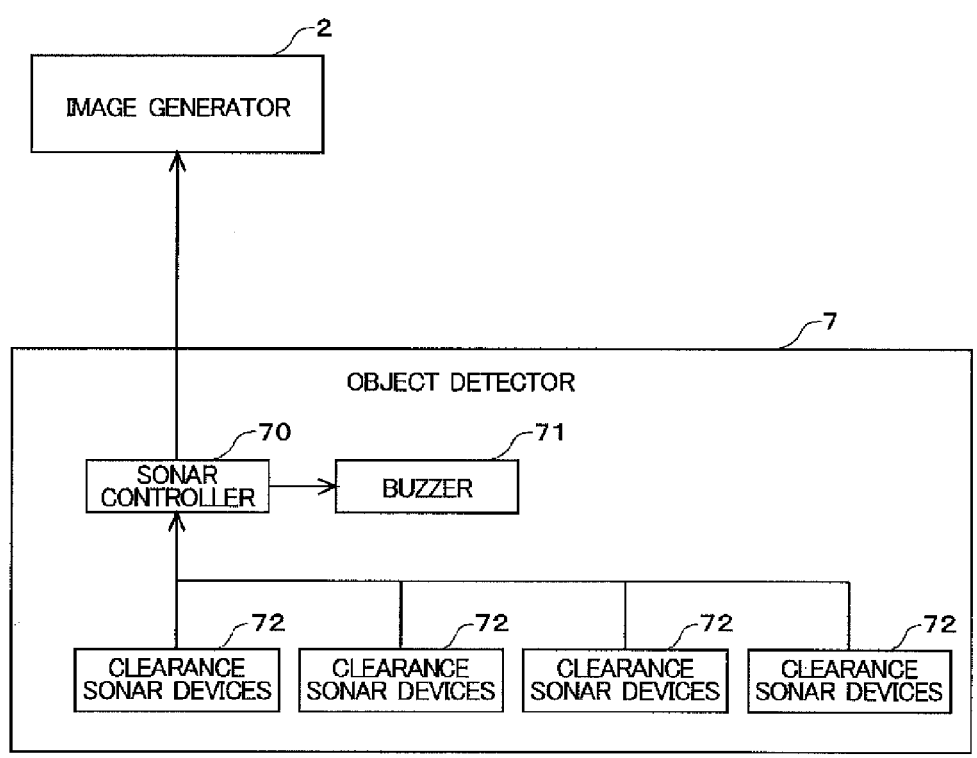
FIG. 18 primarily shows a configuration of an object detector.

FIG. 18 primarily shows the configuration of the object detector 7. As shown in the figure, the object detector 7 includes a sonar controller 70 that collectively controls the whole of the object detector 7, a plurality of clearance sonar devices 72, and a buzzer 71 that sounds a warning alarm inside a vehicle cabin.

Each of the plurality of clearance sonar devices 72 emits ultrasonic waves and receives the reflection waves that the emitted ultrasonic waves have reflected off the object, to detect the object existing in the periphery of the own vehicle 9. Moreover, each of the plurality of clearance sonar devices 72 is capable of detecting the distance to the object based on the period of time from emission of the ultrasonic wave to reception of the corresponding reflection wave. The result of detection by each of the plurality of clearance sonar devices 72 is entered to the sonar controller 70. The sonar controller 70 controls the buzzer 71 to sound the warning alarm in accordance with the distance to the object. This informs the user that an object exists in the periphery of the own vehicle 9.

Figure 19:
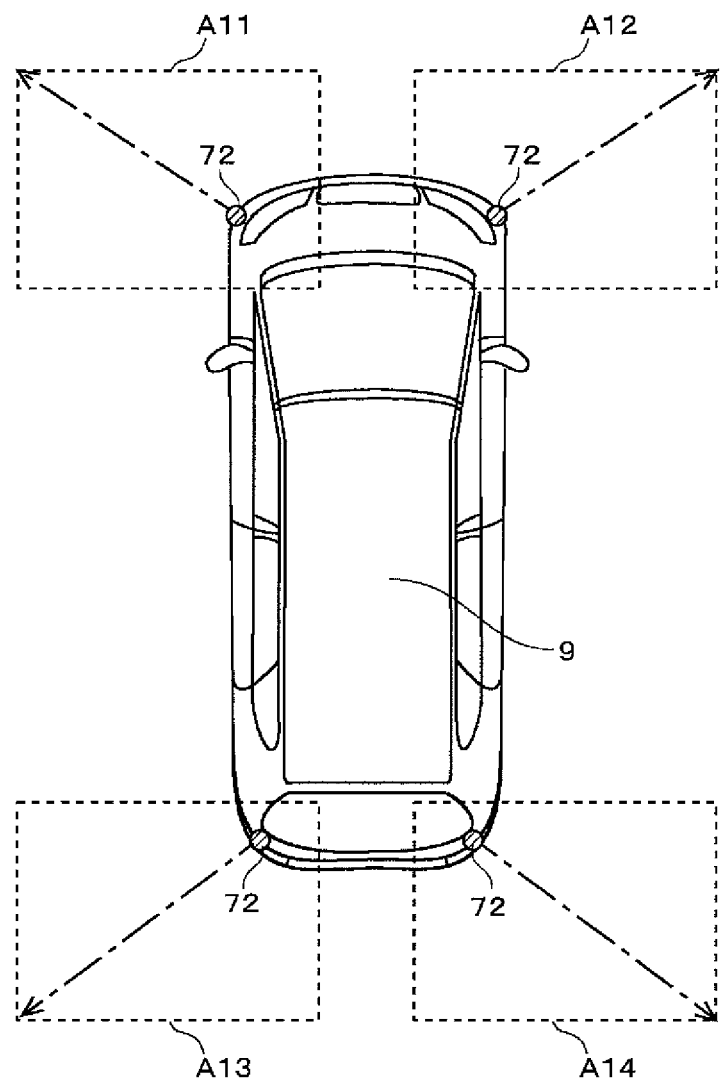
FIG. 19 shows the locations where a plurality of clearance sonar devices are disposed.

FIG. 19 shows the locations of the plurality of clearance sonar devices 72 disposed on the own vehicle 9. The plurality of clearance sonar devices 72 are respectively disposed at the left corner and the right corner on the front of the own vehicle 9, and at the left corner and the right corner on the back of the own vehicle 9.

The plurality of clearance sonar devices 72 emit the ultrasonic waves respectively to a part of the periphery of the own vehicle 9: a periphery area A11, a periphery area A12, a periphery area A13 and a periphery area A14. Particularly, one of the plurality of clearance sonar devices 72 disposed at the left corner on the front of the own vehicle 9 emits the ultrasonic waves to the periphery area A11 set in the forward-left area of the own vehicle 9. Another one of the plurality of clearance sonar devices 72 disposed at the right corner on the front of the own vehicle 9 emits the ultrasonic waves to the periphery area A12 set in the forward-right area of the own vehicle 9. Another one of the plurality of clearance sonar devices 72 disposed at the left corner on the back of the own vehicle 9 emits the ultrasonic waves to the periphery area A13 set in the rear-left area of the own vehicle 9. Another one of the plurality of clearance sonar devices 72 disposed at the right corner on the back of the own vehicle 9 emits the ultrasonic waves to the periphery area A14 set in the rear-right area of the own vehicle 9.

The four periphery areas A11, A12, A13 and A14 are set in the predetermined fixed correlative locations to the own vehicle 9. Such deployment of the plurality of clearance sonar devices 72 allows for detection by the object detector 7, of the object existing in one of the four periphery areas A11, A12, A13 and A14. The object detector 7 obtains the information about which area of the four periphery areas A11, A12, A13 and A14 the detected object exists in, based on the location of the one of the plurality of clearance sonar devices 72 that has detected the object. Moreover, the object detector 7 obtains the distance to the detected object.

The result signal showing the result of the detection by the object detector 7 includes such a location of the object and a distance to the object. The sonar controller 70 outputs the result signal to the image generator 2. Therefore, an image controller 20a of the image generator 2 can use the result of the detection by the object detector 7.

The image controller 20a provides a normal mode M1 as the display mode when the object detector 7 has not detected any object. When the object detector 7 has detected the object, the image controller 20a provides an enlarged mode M2 as the display mode so that the user can easily and closely check the object. In the enlarged mode M2, an enlarged composite image CPE showing the enlarged image of the area corresponding to the location of the object detected by the object detector 7 is displayed. In the case where the object detector 7 has detected the object existing in the periphery area A11 that is the forward-left area of the own vehicle 9, the enlarged composite image CPE showing the enlarged image of the forward-left area in the vicinity of the own vehicle 9 is displayed in the enlarged mode M2.

Figure 20:
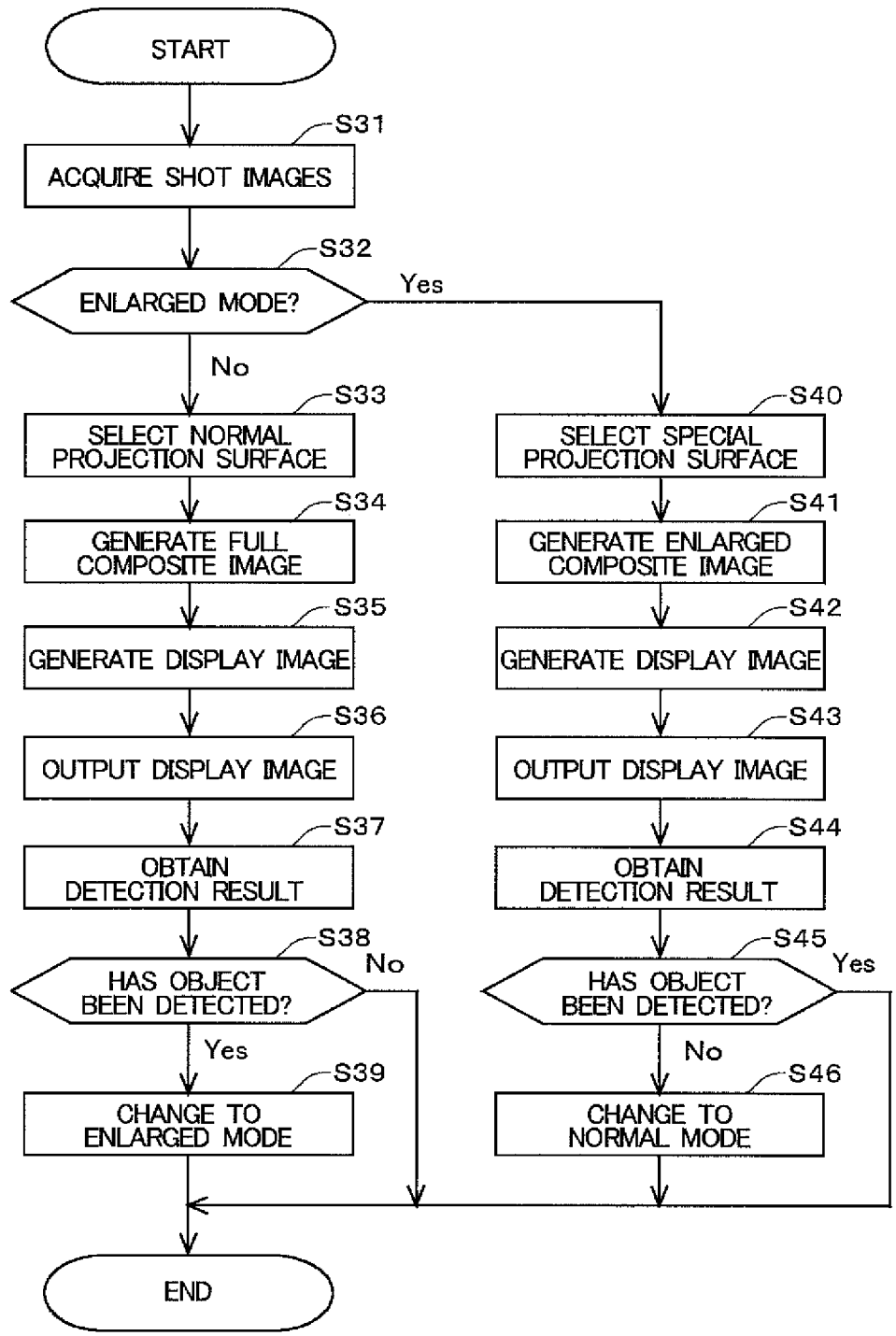
FIG. 20 shows a processing flow on the image display system of the second embodiment.

FIG. 20 shows the flow of the processing on the image display system 10 of the second embodiment. The processing shown in FIG. 20 is substantially the same as the processing of the first embodiment shown in FIG. 16, despite of the different conditions for changing the display mode.

Four of cameras 5 respectively capture shot images of the periphery of the own vehicle 9. Then, an image acquisition part 21 acquires the four of the shot images (step S31). Next, the image controller 20a judges whether the display mode is the normal mode M1 or the enlarged mode M2 (step S32).

In the case when the display mode is the normal mode M1 (No at the step S32), an image composer 22 selects a normal projection surface TS1 as a projection surface TS for generation of the composite image CP (step S33), and generates a full composite image CPF by use of the normal projection surface TS1 (step S34). Next, an image adjuster 23 generates a display image DP including the full composite image CPF (step S35). An image output part 24 outputs the display image DP to a display 3 (step S36). As above, the display image DP including the full composite image CPF is displayed on the display 3.

Next, the image controller 20a obtains the result of detection of the object detected by the object detector 7, based on the result signal received by the signal receiver 26 from the object detector 7 (step S37). Then, the image controller 20a judges based on the result of detection whether the object detector 7 has detected the object existing in the periphery of the own vehicle 9 (step S38).

When the object detector 7 has not detected any object (No at the step S38), the image controller 20a holds the display mode in the normal mode M1. When the object detector 7 has detected the object (Yes at the step S38), the image controller 20a changes the display mode to the enlarged mode M2 for displaying the enlarged composite image CPE (step S39).

In the case where the display mode is the enlarged mode M2 at the step S32 (Yes at the step S32), the image composer 22 selects a special projection surface TS2 as the projection surface TS for generation of the composite image CP (step S40), and generates the enlarged composite image CPE showing an enlarged image of the periphery in which the object has been detected (step S41). Next, the image adjuster 23 generates the display image DP including the enlarged composite image CPE (step S42). The image output part 24 outputs the generated display image DP to the display 3 (step S43). As above, the display image DP including the enlarged composite image CPE is displayed on the display 3.

Next, the image controller 20a obtains the result of detection of the object detected by the object detector 7, based on the result signal received by the signal receiver 26 from the object detector 7 (step S44). Then, the image controller 20a judges based on the result of detection whether the object detector 7 keeps detecting the object (step S45).

While the object detector 7 keeps detecting the object (Yes at the step S45), the image controller 20a holds the display mode in the enlarged mode M2. When the object detector 7 has not detected the object any more (No at the step S45), the image controller 20a changes the display mode to the normal mode M1 for displaying the full composite image CPF (step S46).

As above, on the image display system 10 of the second embodiment, when the object detector 7 that detects the object existing in the vicinity of the own vehicle 9 has not detected any object, the normal mode M1 is set as the display mode. When the object detector 7 has detected the object, the enlarged mode M2 is set as the display mode. Therefore, when the object detector 7 has not detected any object, the image composer 22 generates the composite image CP by use of the normal projection surface TS1. When the object detector 7 has detected the object, the image composer 22 generates the composite image CP by use of the special projection surface TS2.

As above, when the object detector 7 has detected the object, the composite image CP is generated by use of the special projection surface TS2. In the case where the user looks at the composite image CP, the degree to which the user feels that the object is away from the own vehicle 9 can be reduced. On the other hand, when the object detector 7 has not detected any object, the own vehicle 9 is in less danger of colliding with an object. Thus, for generation of the composite image CP with less feeling of strangeness, the normal projection surface TS1 is used.

In the embodiment, when the object detector 7 has detected the object, the image composer 22 generates the enlarged composite image CPE. However, the image composer 22 may generate the full composite image CPF by use of the special projection surface TS2. When the user looks at the full composite image CPF generated as above, the degree to which the user feels that the object is away from the own vehicle 9 can also be reduced.

3. Third Embodiment

Next, the third embodiment is described. The configuration and the processing on an image display system 10 of the third embodiment are substantially the same as the ones of the second embodiment. Thus, the points different from the second embodiment are primarily described. The image display system 10 of the third embodiment is capable of changing the slope of a curved area R3 that is a projection subject area on a special projection surface TS2, in accordance with the height of the detected object that exists in the periphery of an own vehicle 9.

Figure 21:
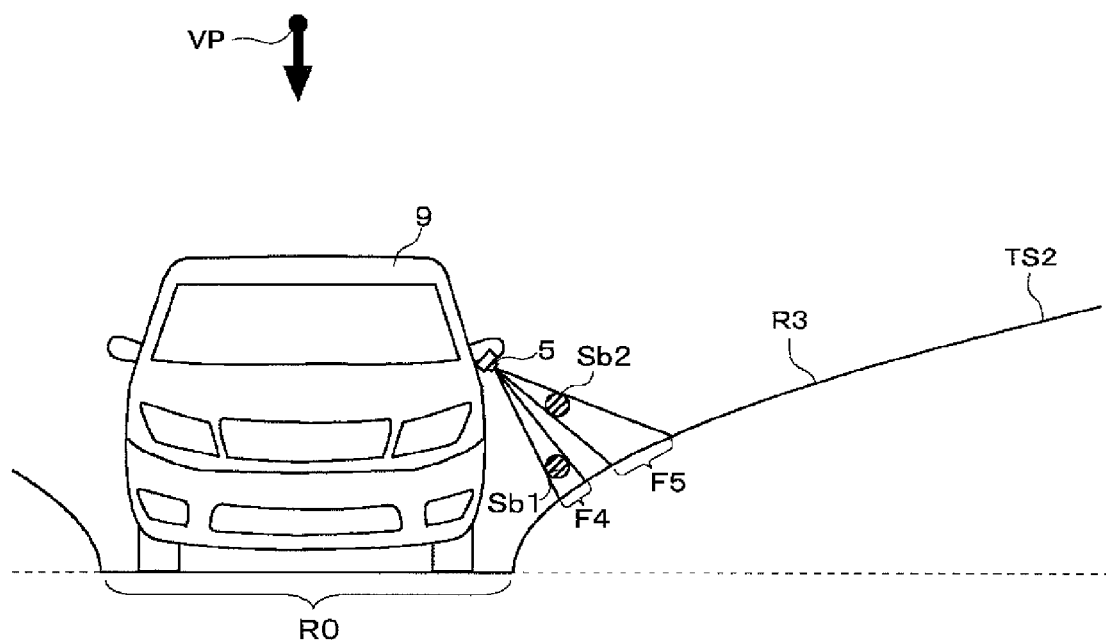
FIG. 21 shows the locations where the images of objects are projected by use of the special projection surface.

FIG. 21 shows the locations where the images of the two of an object Sb1 and an object Sb2 existing in the vicinity of the own vehicle 9 are projected by use of the special projection surface TS2. The two objects Sb1 and Sb2 shown in FIG. 21 are located in the same distance from the own vehicle 9, but at different heights from a road. The image of the object Sb1 located relatively low is projected onto a projection location F4 in the figure. The image of the object Sb2 located relatively high is projected onto a projection location F5 in the figure.

As above, when the two objects Sb1 and Sb2 are located at the different heights even in the same distance from the own vehicle 9, the images of the two objects Sb1 and Sb2 are projected onto the different locations in the curved area R3 of the special projection surface TS2. Moreover, the higher from the road the object is located, the farther away from a vehicle area R0 the image of the object is projected. Therefore, the higher the object included in a composite image CP looked by a user is located, the farther away from the own vehicle 9 the user feels that the object is.

Figure 22:
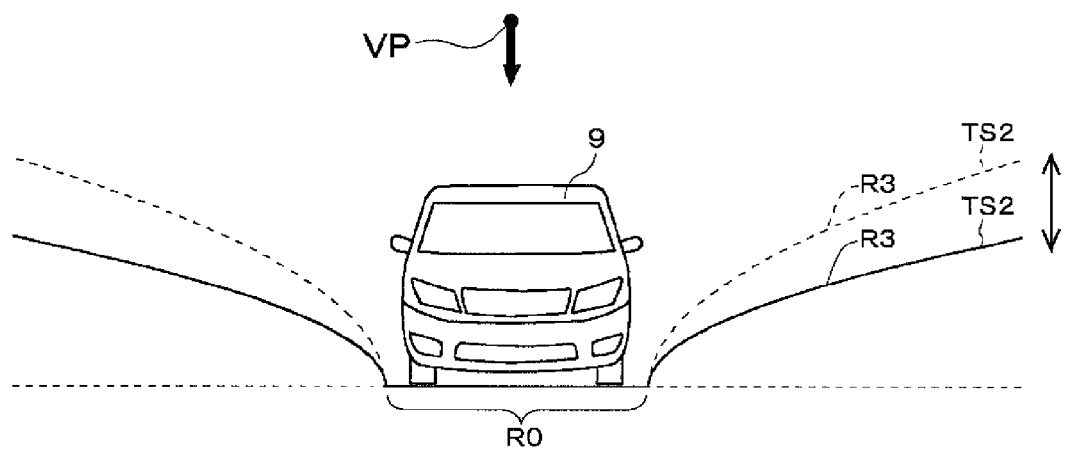
FIG. 22 describes change of the slope of a curved area on the special projection surface.

To respond to this issue, the image display system 10 of the third embodiment changes the slope of the curved area R3 that is the projection subject area on the special projection surface TS2, as shown in FIG. 22. An image composer 22 of the image display system 10 changes the slope of the curved area R3 in accordance with the height of the detected object. Particularly, the higher the object is located, the higher the image composer 22 changes the slope of the curved area R3. Moreover, the lower the object is located, the lower the image composer 22 changes the slope of the curved area R3. The higher the slope of the curved area R3 is changed, the closer to the vehicle area R0 the image of the object is projected onto the curved area R3. That is, by changing the slope of the curved area R3 in accordance with the height of the object, the degree to which the user feels that, when looking at the composite image CP, the object is away from the own vehicle 9 can be reduced appropriately to the height of the object.

Figure 23:
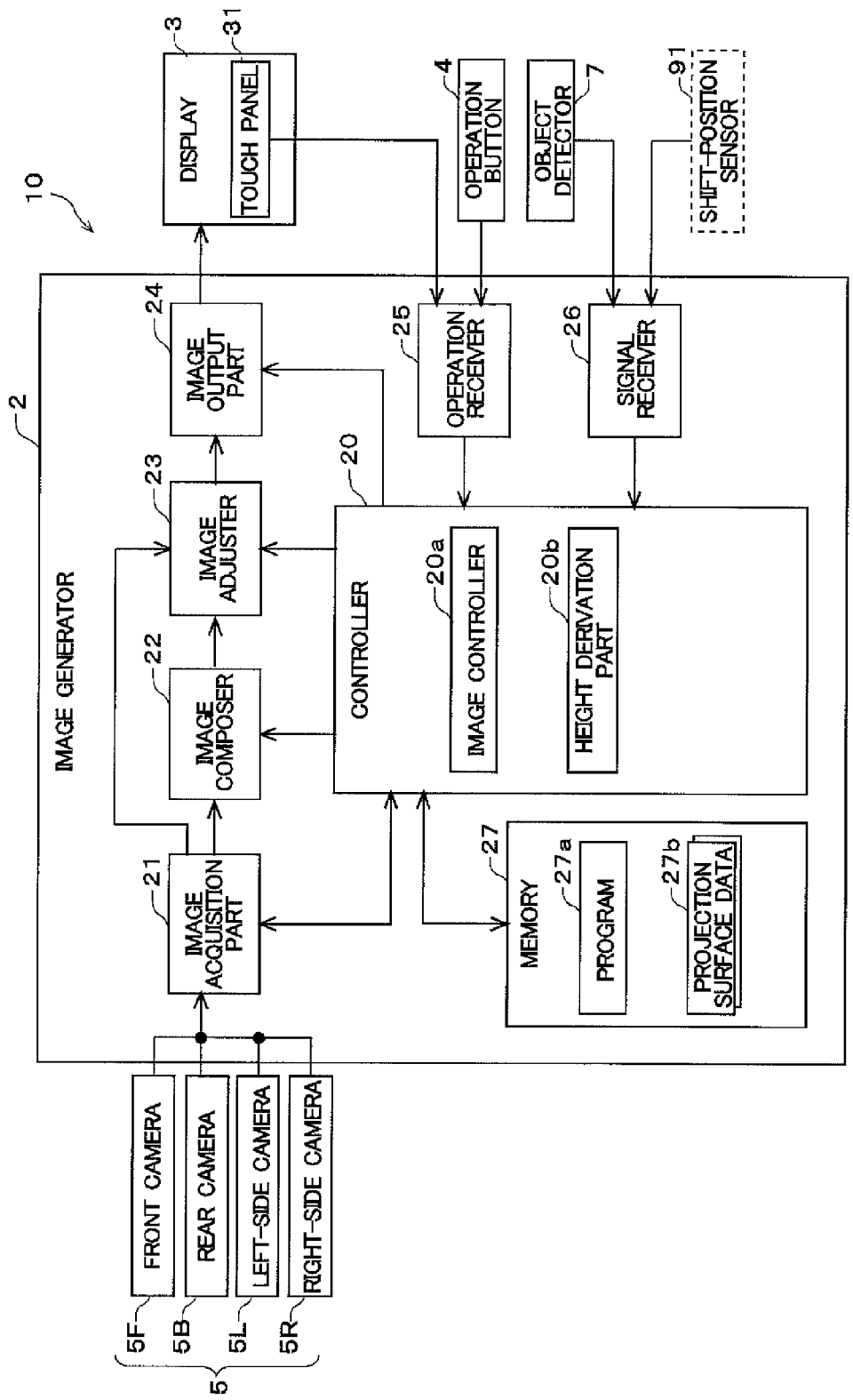
FIG. 23 shows a configuration of an image display system of the third embodiment.

FIG. 23 shows the configuration of the image display system 10 of the third embodiment. The image display system 10 of the third embodiment further includes a height derivation part 20b that derives the height of the object detected by the object detector 7, in addition to the configuration of the second embodiment shown in FIG. 17. The height derivation part 20b is a part of the function parts that are performed by CPU processing of a controller 20 in accordance with a program 27a.

In the case where an object detector 7 detects an object, the height derivation part 20b derives the height of the object by use of the shot images of the object captured by a plurality of cameras 5. In an example, the height derivation part 20b is capable of deriving the height of the object in accordance with the principle of a stereo camera, based on the locations of the images of the same object included in the multiple shot images successively captured by one of the plurality of cameras 5. The height derivation part 20b may derive the height of the object in accordance with the principle of the stereo camera, based on the locations of the images of the same object included in the two shot images concurrently but respectively captured by the two of the plurality of cameras 5. The height derivation part 20b may also derive the height of the object based on the distance to the object detected by the object detector 7 and the location of the image of the object included in the shot image.

Figure 24:
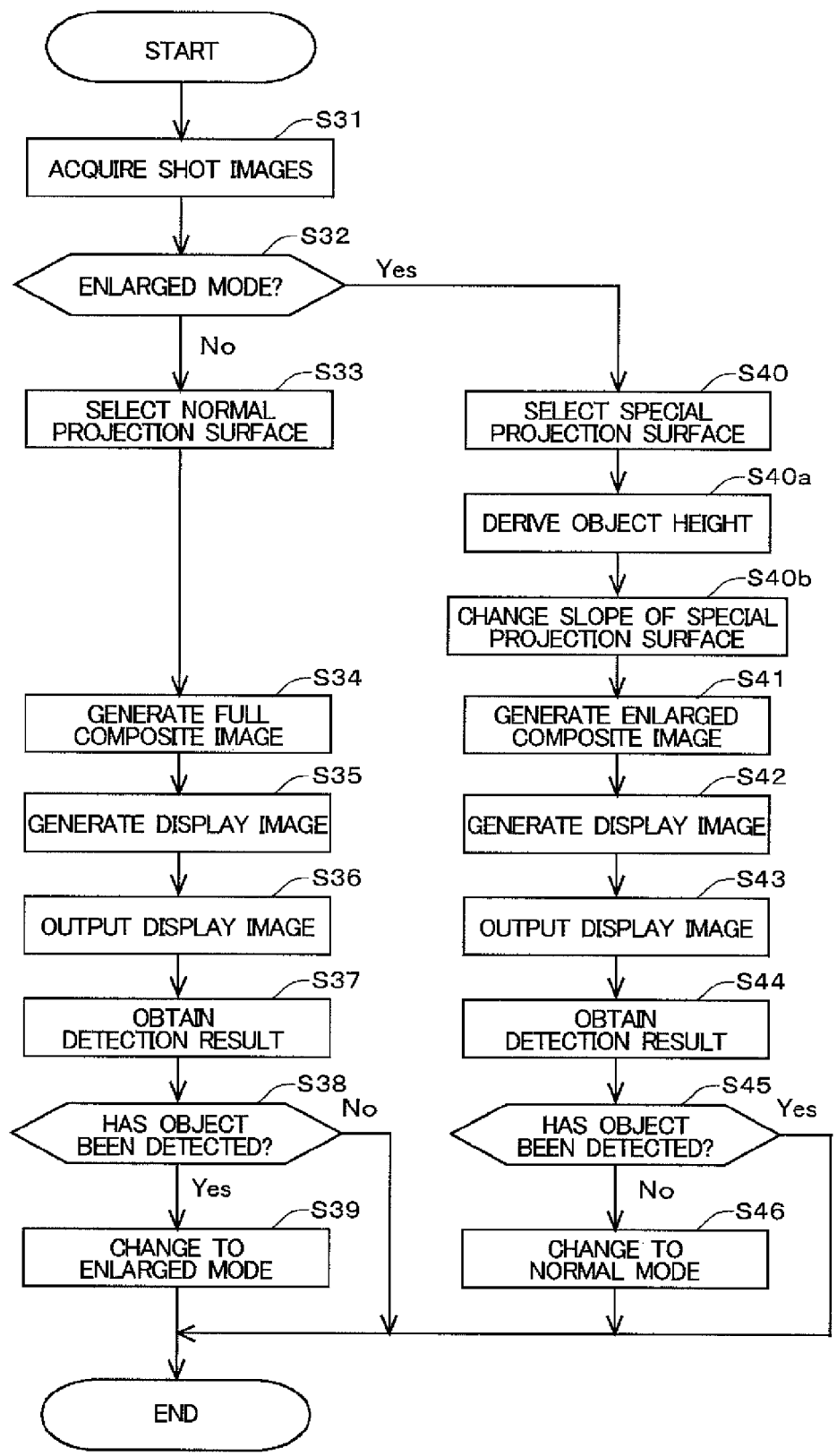
FIG. 24 shows a processing flow on the image display system of the third embodiment.

FIG. 24 shows the flow of the processing on the image display system 10 of the third embodiment. A step S40a and a step S40b are added between the step S40 and the step S41 for the processing of the second embodiment shown in FIG. 20. The processing in the case where a normal mode M1 is set as the display mode (No at the step S32) is the same as the processing of the second embodiment. Thus, the processing in the case where an enlarged mode M2 is set as the display mode (Yes at the step S32) is described below. The case where the enlarged mode M2 is set as the display mode is seen when the object detector 7 has detected the object (Yes at the step S38).

When the enlarged mode M2 is set as the display mode at the step S32, the image composer 22 first selects the special projection surface TS2 as a projection surface TS for generation of the composite image CP (step S40).

Next, the height derivation part 20b derives the height of the object detected by the object detector 7 (step S40a). The height derivation part 20b obtains at least one shot image of the object detected by the object detector 7, the at least one shot image being captured by at least one of the plurality of cameras 5, and derives the height of the object based on at least one location of at least one image of the object included in the at least one shot image.

Next, the image composer 22 changes the slope of the curved area R3 on the special projection surface TS2 in accordance with the derived height of the object, based on the control by the image controller 20a (step S40b). The higher the object is located, the higher the image composer 22 changes the slope of the curved area R3. On the other hand, the lower the object is located, the lower the image composer 22 changes the slope of the curved area R3. The slope of the curved area R3 can be changed by use of the coefficient "a" in the formula (1) described above.

Next, the image composer 22 generates an enlarged composite image CPE by use of the special projection surface TS2 including the curved area R3 where the slope has been changed in accordance with the height of the object (step S41). Next, an image adjuster 23 generates a display image DP including the enlarged composite image CPE (step S42). Then, an image output part 24 outputs the display image DP to a display 3 (step S43). As above, the display image DP including the enlarged composite image CPE is displayed on the display 3. The processing hereafter is the same as the processing of the second embodiment.

As above, on the image display system 10 of the third embodiment, the image composer 22 changes the slope of the curved area R3 on the special projection surface TS2 in accordance with the height of the object existing in the vicinity of the own vehicle 9. Thus, the degree to which the user feels that, when looking at the composite image CP, the object is away from the own vehicle 9 can be reduced appropriately to the height of the object.

The example in FIG. 21 of the object that exists above the road in a distance was described. However, the object to be covered by the image display system 10 of the third embodiment may be the object in contact with the road. That is, the image composer 22 may change the slope of the curved area R3 on the special projection surface TS2 in accordance with the vertical length of the object in contact with the road. The longer vertically the object in contact with the road is, the farther away from the vehicle area R0 the location where the image of the object is projected is. That is, the slope of the curved area R3 on the special projection surface TS2 is changed in accordance with the vertical length of the object, which allows for the generation of the composite image CP appropriately including the image of the vertically-long object.

4. Modification

So far, the embodiments of the invention have been described. However, the invention is not to be considered limited to the described embodiments above, and includes various modifications. Hereafter, these modifications are described. All embodiments including the embodiments described above and the embodiments to be described below can be arbitrarily combined with others.

The projection subject area on the special projection surface TS2 described above is the curved area R3 that is created in the shape having an overall upward convex curve in the periphery of the vehicle area R0. However, a projection subject area on a special projection surface may be created in the shape having an upward convex curve only partially in the periphery of a vehicle area R0 and having the same shape as a normal projection surface in the rest area. In an example, only the area where a user specifies or where an object has been detected within the projection subject area on the specific projection surface may be created in the shape having the upward convex curve.

The projection subject area on the special projection surface TS2 described above is the curved area R3 that is created in the shape where the overall slope is gradually lowered with distance from the vehicle area R0. However, a projection subject area on a special projection surface may include the combination of a plurality of flat areas differing in slope or the combination of at least one curved area and at least one flat area, with distance from a vehicle area R0. In any case, simply the projection subject area on the special projection surface needs only the area where the distances from the vehicle area R0 are relatively short and where the slope is relatively high, and the area where the distances from the vehicle area R0 are relatively long and where the slope is relatively low. However, a curved projection subject area is desirable so as to generate a smoother image of an object. A flat surface, when used for the projection subject area, may be used as the horizontal plane area where the distances from a vehicle area R0 are relatively long.

The projection subject area on the normal projection surface TS1 described above includes the combination of the flat area R1 that is the horizontal plane adjacent to the vehicle area R0, and the curved area R2 that is away from the vehicle area R0. However, the area that is adjacent to a vehicle area R0 within the projection subject area on a normal projection surface may not be created by the horizontal plane completely along the horizontal direction. The area may be created by a curved surface or a flat surface that slightly inclines, as long as the surface is substantially horizontal. The whole of the normal projection surface may be the horizontal plane. In any case, simply the projection subject area on the normal projection surface needs only substantially-horizontal area in contact with the vehicle area R0 (location of the own vehicle 9).

An image display system 10 may use a projection surface TS other than the normal projection surface TS1 and the special projection surface TS2 for generation of a composite image in accordance with conditions.

Each of the image display systems 10 of the embodiments described above generates the composite image (overview image) viewed from the virtual viewpoint set straight above the own vehicle 9. However, an image display system 10 may generate a composite image viewed from the virtual viewpoint set at another point.

Each of the image display systems 10 of the second embodiment and the third embodiment detects the object existing in the periphery of the own vehicle 9 by use of the plurality of clearance sonar devices 72. However, an image display system 10 may detect the object existing in the periphery of an own vehicle 9 by another method such as object detection by a radar apparatus or object recognition based on a shot image.

An image display system 10 may include another function such as a navigation function that provides route guidance to a destination, in addition to the function to display the display images showing the periphery of the own vehicle 9 described above. On an image display system 10 including the navigation function, the navigation function is activated in a normal state. Only when a user makes a predetermined operation, the function to display the display images described above is activated. The navigation function may be included in an image generator 2 or in a display 3.

In the embodiments described above, various functions are implemented by software, specifically by CPU processing based on programs. However, some of these functions may be implemented by electrical hardware circuits. Contrarily, some of the functions implemented by hardware circuits in the above descriptions may be implemented by software.

While the invention has been shown and described in detail, the foregoing description is in all aspects illustrative and not restrictive. It is therefore understood that numerous other modifications and variations can be devised without departing from the scope of the invention.

What is claimed is:

1. An image generator that is used in a vehicle, the image generator comprising:
   an acquisition part that acquires a plurality of shot images captured by a plurality of cameras disposed on the vehicle, each of the plurality of shot images showing a periphery of the vehicle; and
   a generator that projects data of the plurality of shot images onto a virtual projection surface which corresponds to the periphery of the vehicle, and that generates a composite image showing the periphery of the vehicle viewed from a virtual viewpoint, by use of the data projected onto the virtual projection surface,
   wherein:
   the virtual projection surface includes a first virtual projection surface that has:
      a first area that is a first distance from a location of the vehicle and has a first slope, and
      a second area that is a second distance from the location of the vehicle, the second distance being further than the first distance and has a second slope, the second slope being lower than the first slope,
   the virtual projection surface includes a second virtual projection surface that is created in a different shape from the first virtual projection surface, and
   the generator generates as the composite image either a full composite image, showing a whole area of the periphery of the of the vehicle, or an enlarged composite image, showing a partially-enlarged vicinity of the vehicle, such that the second virtual projection surface is used to generate the full composite image and the first virtual projection surface is used to generate the enlarged composite image.

2. The image generator of claim 1, wherein the first virtual projection surface has an upward convex curve.

3. The image generator of claim 1, wherein a slope of a part of the first virtual projection surface opposed to one of a front face and a back face of the vehicle within the first virtual projection surface is higher than a slope of another part of the first virtual projection surface opposed to one of side faces of the vehicle.

4. The image generator of claim 1, wherein:
   the generator selectively uses the first virtual projection surface and the surface, and the second virtual projection surface includes an area that is substantially horizontal and that is in contact with the location of the vehicle.

5. The image generator of claim 4, wherein the generator:
uses the second virtual projection surface when a detector that detects an object existing in a vicinity of the vehicle has not detected the object, and
uses the first virtual projection surface when the detector has detected the object.

6. The image generator of claim 1, wherein the generator changes a slope of the first virtual projection surface in accordance with a height of an object detected by a detector that detects the object existing in a vicinity of the vehicle.

7. The image generator of claim 1, wherein the first slope deviates from horizontal more than the second slope deviates from horizontal.

8. An image display system that is used in a vehicle, the image display system comprising:
an acquisition part that acquires a plurality of shot images captured by a plurality of cameras disposed on the vehicle, each of the plurality of shot images showing a periphery of the vehicle;
a generator that projects data of the plurality of shot images onto a virtual projection surface which corresponds to the periphery of the vehicle, and that generates a composite image showing the periphery of the vehicle viewed from a virtual viewpoint, by use of the data projected onto the virtual projection surface; and
a display that shows the composite image,
wherein:
the virtual projection surface includes a first virtual projection surface that has:
a first area that is a first distance from a location of the vehicle and has a first slope, and
a second area that is a second distance from the location of the vehicle and has a second slope, the second slope being lower than the first slope,
the virtual projection surface includes a second virtual projection surface that is created in a different shape from the first virtual projection surface, and
the generator generates as the composite image either a full composite image, showing a whole area of the periphery of the of the vehicle, or an enlarged composite image, showing a partially-enlarged vicinity of the vehicle, such that the second virtual projection surface is used to generate the full composite image and the first virtual projection surface is used to generate the enlarged composite image.

9. The image display system of claim 8, wherein the first slope deviates from horizontal more than the second slope deviates from horizontal.

10. An image generation method for use in a vehicle, the image generation method comprising the steps of:
(a) acquiring a plurality of shot images captured by a plurality of cameras disposed on the vehicle, each of the plurality of shot images showing a periphery of the vehicle; and
(b) projecting data of the plurality of shot images onto a virtual projection surface which corresponds to the periphery of the vehicle, and generating a composite image showing the periphery of the vehicle viewed from a virtual viewpoint, by use of the data projected onto the virtual projection surface,
wherein:
the virtual projection surface includes a first virtual projection surface that has:
a first area that is a first distance from a location of the vehicle and has a first slope, and
a second area that is a second distance from the location of the vehicle and has a second slope, the second slope being lower than the first slope,
the virtual projection surface includes a second virtual projection surface that is created in a different shape from the first virtual projection surface, and
the generator generates as the composite image either a full composite image, showing a whole area of the periphery of the of the vehicle, or an enlarged composite image, showing a partially-enlarged vicinity of the vehicle, such that the second virtual projection surface is used to generate the full composite image and the first virtual projection surface is used to generate the enlarged composite image.

11. The image generation method of claim 10, wherein the first virtual projection surface has an upward convex curve.

12. The image generation method of claim 10, wherein a slope of a part of the first virtual projection surface opposed to one of a front face and a back face of the vehicle within the first virtual projection surface is higher than a slope of another part of the first virtual projection surface opposed to one of side faces of the vehicle.

13. The image generation method of claim 10, wherein in step (b), the generator selectively uses the first virtual projection surface and the second virtual projection surface, and
the second virtual projection surface includes an area that is substantially horizontal and that is in contact with the location of the vehicle.

14. The image generation method of claim 13, wherein in step (b), the generator:
uses the second virtual projection surface when a detector that detects an object existing in a vicinity of the vehicle has not detected the object, and
uses the first virtual projection surface when the detector has detected the object.

15. The image generation method of claim 10, wherein in step (b), the generator changes a slope of the first virtual projection surface in accordance with a height of an object detected by a detector that detects the object existing in a vicinity of the vehicle.

16. The image generation method of claim 10, wherein the first slope deviates from horizontal more than the second slope deviates from horizontal.

17. The image generator of claim 1, wherein the generator uses the first virtual projection surface when a detector detects an object in the vicinity of the vehicle.

* * * * *